(12) United States Patent
Hayashi et al.

(10) Patent No.: US 8,531,926 B2
(45) Date of Patent: Sep. 10, 2013

(54) OPTICAL SYSTEM FOR OPTICAL PICKUP

(75) Inventors: Katsuhiko Hayashi, Nara (JP);
Yasuhiro Tanaka, Hyogo (JP);
Michihiro Yamagata, Osaka (JP);
Fumitomo Yamasaki, Nara (JP)

(73) Assignee: Panasonic Corporation, Kadoma-shi (JP)

( * ) Notice: Subject to any disclaimer, the term of this patent is extended or adjusted under 35 U.S.C. 154(b) by 0 days.

(21) Appl. No.: 13/411,645

(22) Filed: Mar. 5, 2012

(65) Prior Publication Data

US 2012/0163155 A1    Jun. 28, 2012

Related U.S. Application Data

(63) Continuation of application No. PCT/JP2010/005689, filed on Sep. 17, 2010.

(30) Foreign Application Priority Data

Sep. 17, 2009  (JP) ................................ 2009-216225

(51) Int. Cl.
*G11B 7/00* (2006.01)

(52) U.S. Cl.
USPC ............... 369/44.32; 369/94; 369/112.23; 369/44.23; 369/283

(58) Field of Classification Search
USPC ............... 369/44.32, 44.23, 112.23, 94, 283, 369/112.01
See application file for complete search history.

(56) References Cited

U.S. PATENT DOCUMENTS

| | | | |
|---|---|---|---|
| 6,927,923 B2* | 8/2005 | Kimura | 359/719 |
| 7,253,968 B2* | 8/2007 | Kimura et al. | 359/719 |
| 7,333,416 B2* | 2/2008 | Saito et al. | 369/112.08 |
| 2004/0100703 A1* | 5/2004 | Kimura et al. | 359/719 |
| 2005/0281172 A1* | 12/2005 | Wachi | 369/112.23 |
| 2007/0121470 A1* | 5/2007 | Nakamura et al. | 369/112.01 |
| 2007/0291619 A1* | 12/2007 | Hayashi et al. | 369/112.02 |
| 2008/0013415 A1* | 1/2008 | Nomura et al. | 369/44.23 |
| 2010/0074077 A1* | 3/2010 | Katayama | 369/53.12 |

FOREIGN PATENT DOCUMENTS

| | | |
|---|---|---|
| JP | H11-259906 A | 9/1999 |
| JP | 2007-323793 A | 12/2007 |
| JP | 2007-334965 A | 12/2007 |
| JP | 2009-087413 A | 4/2009 |
| JP | 2010-238277 A | 10/2010 |

* cited by examiner

*Primary Examiner* — Thomas Alunkal
(74) *Attorney, Agent, or Firm* — Judge Patent Associates

(57) ABSTRACT

An optical system for optical pickup includes a magnification conversion optical element moving along an optical axis direction in accordance with each of optical recording medium recording surfaces, and an objective lens element converging a light beam incident through the magnification conversion optical element, to form a spot on a corresponding one of the recording surfaces, and satisfies the following formula: $4.0\times10^{-4} < Mn/(tn-tc)\times f < 6.0\times10^{-4}$. Here tc is the thickness [μm] of a recording-medium base material at which a third-order spherical aberration occurring when a parallel light beam is incident on the objective lens element is the minimum, f is the focal length [mm] of the objective lens element, and Mn is the imaging magnification of the objective lens element when a spot is formed through a thickness tn [μm] of the base plate.

6 Claims, 21 Drawing Sheets

OPTICAL SYSTEM FOR OPTICAL PICKUP

CROSS-REFERENCE TO RELATED APPLICATION

This application is a U.S. continuation application filed under 35 USC 111(a) claiming benefit under 35 USC 120 and 365(c) of PCT application JP2010/005689, filed Sep. 17, 2010, which claims priority to Japanese Patent Application No. 2009-216225, filed on Sep. 17, 2009. The foregoing applications are hereby incorporated herein by reference.

BACKGROUND OF THE INVENTION

1. Field of the Invention

The present invention relates to an optical system for optical pickup, which is used in an optical pickup device which performs at least one of reading, writing, and erasing of information on an information storage medium such as a plurality of optical discs having different light-transmitting layer thicknesses.

2. Description of the Background Art

Due to practical application of a blue-violet semiconductor laser, Blue-ray Disc (registered trademark; hereinafter, referred to as "BD"), which is a high-density and high-capacity optical information storage medium (hereinafter, also referred to as "optical disc") having the same size as those of CD (Compact Disc) and DVD, has been put into practical use.

The thickness of the light-transmitting layer of CD is 1.2 mm, the wavelength of the laser beam for performing recording or reproducing is about 785 nm, the numerical aperture NA of the objective lens is 0.45 to 0.52, and the recording capacity is about 650 MByte.

The thickness of the light-transmitting layer of DVD is about 0.6 mm, the wavelength of the laser beam for performing recording or reproducing is about 660 nm, the numerical aperture NA of the objective lens is 0.60 to 0.66, and the recording capacity of an information recording surface of one layer is about 4.7 GByte. A single-layer disc having a single information recording surface and a two-layer disc having two information recording surfaces have been put into practical use.

The thickness of the light-transmitting layer of BD is about 0.1 mm, the wavelength of the laser beam for performing recording or reproducing is about 405 nm, the numerical aperture NA is about 0.85, and the recording capacity of an information recording surface of one layer is about 25 GByte. As BD as well, a single-layer disc having a single information recording surface and a two-layer disc having two information recording surfaces have been put into practical use.

As in BD, when recording or reproducing of information is performed on a plurality of information recording surfaces, the thickness of the light-transmitting layer is different at each information recording surface. On an information recording surface which is located at a depth different from the optimum light-transmitting layer thickness for the objective lens (the thickness of the light-transmitting layer at which a third-order spherical aberration is the minimum when parallel light is incident on the objective lens), a third-order spherical aberration corresponding to the difference from the optimum light-transmitting layer thickness occurs. In BD, with respect to a light-transmitting layer thickness error of 10 μm, a third-order spherical aberration of about 100 mλ occurs. Thus, in general, an optical pickup device which performs recording or reproducing on BD includes a means for compensating a third-order spherical aberration.

For example, Japanese Laid-Open Patent Publication No. 11-259906 discloses an optical pickup device which includes a collimating lens mounted on a collimating lens actuator and located between a light source and an objective lens and which moves the collimating lens along the optical axis direction so as to cancel a third-order spherical aberration caused by a thickness difference of the light-transmitting layer, thereby changing the divergence angle or convergence angle of a laser beam incident on the objective lens.

Meanwhile, many optical pickup devices for high-density optical disc such as BD, which use a short-wavelength laser beam and a high-NA objective lens, include a means for compensating a third-order coma aberration which occurs due to tilt of the optical disc (hereinafter, also referred to as "disc tilt"). For example, a method in which an objective lens mounted on an objective lens actuator is tilted in the radial direction of the optical disc, and a method using a liquid crystal element have been put into practical use.

In recent years, various optical pickup devices have been proposed in which a plurality of objective lenses is mounted to ensure compatibility with CD, DVD, and BD.

FIG. 20 is a diagram showing an example of an optical pickup device (optical head) configured with two objective lenses.

The optical pickup device 140 shown in FIG. 20 includes a blue-violet laser beam source 101 which emits a blue-violet laser beam, a relay lens 102, a polarizing beam splitter 103, a collimating lens 104, a plate-shaped mirror 105, a quarter wavelength plate 106, a diffractive lens 107, an objective lens 108, an objective lens actuator 109, a two-wavelength light source 111 which selectively emits a red laser beam and an infrared laser beam, a diffraction grating 112, a plate type beam splitter 113, a collimating lens actuator 114, a wedge-shaped mirror 115, a quarter wavelength plate 116, a compatible objective lens 118, a detection hologram 121, a detection lens 122, a photo detector 123, and a front monitor sensor 124. The objective lens 108 is dedicated for a BD 90 having information recording surfaces L0 and L1 of two layers, and the compatible objective lens 118 is shared by a DVD 70 and a CD 80.

An operation of the optical pickup device 140 which is performed when recording or reproducing is performed on the BD 90 will be described. A blue-violet laser beam with a wavelength of about 405 nm, which is emitted from the blue-violet laser beam source 101, is converted by the relay lens 102 into diverging light and is incident as S-polarized light on the polarizing beam splitter 103. The laser beam reflected by the polarizing beam splitter 103 is converted by the collimating lens 104 into substantially parallel light, passes through the wedge-shaped mirror 115, and is reflected by the plate-shaped mirror 105 to be bent toward the quarter wavelength plate 106. A portion of the laser beam incident on the plate-shaped mirror 105 passes through the plate-shaped mirror 105 and is incident on the front monitor sensor 124. On the basis of output of the front monitor sensor 124, output of the blue-violet laser beam source 101 is controlled. The laser beam reflected by the plate-shaped mirror 105 is converted by the quarter wavelength plate 106 into circularly polarized light, then passes through the diffractive lens 107, and is converged by the objective lens 108 as a light spot on either one of the information recording surface L0 or L1 of the BD 90.

The blue-violet laser beam reflected by the information recording surface L0 or L1 of the BD 90 passes through the objective lens 108 and the diffractive lens 107 again, is converted by the quarter wavelength plate 106 into linearly polarized light having a polarization plane different from that in the path to the BD 90, and then is reflected by the plate-shaped mirror 105. The light reflected by the plate-shaped mirror 105 passes through the wedge-shaped mirror 115 and the collimating lens 104, then is incident as P-polarized light on the polarizing beam splitter 103, passes through the polarizing beam splitter 103, and is guided to the photo detector 123 via the plate type beam splitter 113, the detection hologram 121, and the detection lens 122. The laser beam detected by the photo detector 123 is photoelectrically converted and then subjected to predetermined arithmetic processing to generate a focus error signal for following surface run-out of the BD 90 and a tracking error signal for following decentering of the BD 90.

Next, an operation of the optical pickup device 140 which is performed when recording or reproducing is performed on the DVD 70 will be described. A red laser beam with a wavelength of about 660 nm, which is emitted from the two-wavelength light source 111, is split by the diffraction grating 112 into a main beam, which is zeroth order light, and sub-beams which are ±1st order diffracted light. The main beam and the sub-beams are incident as S-polarized light on the plate type beam splitter 113, are reflected by the plate type beam splitter 113, pass through the polarizing beam splitter 103, and are converted by the collimating lens 104 into substantially parallel light. The light emitted from the collimating lens 104 is reflected by the wedge-shaped mirror 115 to be bent toward the quarter wavelength plate 116. A portion of the laser beam incident on the wedge-shaped mirror 115 passes through the wedge-shaped mirror 115 and the plate-shaped mirror 105 and is incident on the front monitor sensor 124, and output of the red laser beam of the two-wavelength light source 111 is controlled on the basis of output of the front monitor sensor 124. The laser beam reflected by the wedge-shaped mirror 115 is converted by the quarter wavelength plate 116 into circularly polarized light and then converged by the objective lens 118 as a light spot on an information recording surface of the DVD 70.

The red laser beam reflected by the information recording surface of the DVD 70 passes through the objective lens 118 again, is converted by the quarter wavelength plate 116 into linearly polarized light having a polarization plane different from that in the path to the DVD 70, and then is reflected by the wedge-shaped mirror 115. The light reflected by the wedge-shaped mirror 115 passes through the collimating lens 104, then is incident as P-polarized light on the polarizing beam splitter 103 and the plate type beam splitter 113, passes therethrough, and is guided to the photo detector 123 via the detection hologram 121 and the detection lens 122. The laser beam detected by the photo detector 123 is photoelectrically converted and then subjected to predetermined arithmetic processing to generate a focus error signal for following surface run-out of the DVD 70 and a tracking error signal for following decentering of the DVD 70.

Next, an operation of the optical pickup device 140 which is performed when recording or reproducing is performed on the CD 80 will be described. An infrared laser beam with a wavelength of about 785 nm, which is emitted from the two-wavelength light source 111, is split by the diffraction grating 112 into a main beam, which is zeroth order light, and sub-beams which are ±1st order diffracted light. The main beam and the sub-beams are reflected by the plate type beam splitter 113, pass through the polarizing beam splitter 103, are converted by the collimating lens 104 into substantially parallel light, and are reflected by the wedge-shaped mirror 115 to be bent toward the quarter wavelength plate 116. A portion of the laser beam incident on the wedge-shaped mirror 115 passes through the wedge-shaped mirror 115 and the plate-shaped mirror 105 and is incident on the front monitor sensor 124, and output of the infrared laser beam of the two-wavelength light source 111 is controlled on the basis of output of the front monitor sensor 124. The laser beam reflected by the wedge-shaped mirror 115 passes through the quarter wavelength plate 116 and is converged by the objective lens 118 as a light spot on an information recording surface of the CD 80.

The infrared laser beam reflected by the information recording surface of the CD 80 passes through the objective lens 118 and the quarter wavelength plate 116 again, is reflected by the wedge-shaped mirror 115, and passes through the collimating lens 104. The light emitted from the collimating lens 104 passes through the polarizing beam splitter 103 and the plate type beam splitter 113 and is guided to the photo detector 123 via the detection hologram 121 and the detection lens 122. The laser beam detected by the photo detector 123 is photoelectrically converted and then subjected to predetermined arithmetic processing to generate a focus error signal for following surface run-out of the CD 80 and a tracking error signal for following decentering of the CD 80.

In order to further increase the capacity of an optical disc, it is considered to provide information recording surfaces of multiple layers, which are three layers or more, in a high-density optical disc such as BD. In an optical disc having a plurality of information recording surfaces, predetermined intervals between the information recording surfaces have to be ensured in order to reduce influence of reflected light (stray light) from an adjacent information recording surface (crosstalk of an information signal, offset of a servo signal, and the like). Therefore, in a multilayer optical disc having information recording surfaces of three layers or more, the interval between the information recording surface at which the thickness of the light-transmitting layer is the largest and the information recording surface at which the thickness of the light-transmitting layer is the smallest has to be made larger than that in a conventional two-layer disc.

When recording or reproducing is performed on such a multilayer optical disc, a third-order spherical aberration which occurs in proportion to a difference from the optimum light-transmitting layer thickness for the objective lens increases. Thus, in an optical pickup device for multilayer optical disc, the range in which a collimating lens is moveable has to be made larger than that in the conventional art, to be able to compensate a larger third-order spherical aberration.

In the conventional optical pickup device 140 shown in FIG. 20, in performing recording or reproducing on the BD 90, when the collimating lens 104 is moved along the optical axis direction in order to compensate a third-order spherical aberration which occurs in accordance with the thickness of the light-transmitting layer, non-parallel light (diverging light or converging light) is incident on the wedge-shaped mirror 115 and a third-order astigmatism occurs.

FIG. 21 shows a result obtained by calculating, for each vertex angle α of the wedge-shaped mirror 115, how a third-order astigmatism changes when the collimating lens is moved in accordance with the thickness of the light-transmitting layer. In FIG. 21, the horizontal axis indicates the thickness of the light-transmitting layer, and the vertical axis indicates a third-order astigmatism amount. The calculation conditions are as follows.

Designed wavelength for an objective lens: 405 nm
Designed light-transmitting layer thickness for the objective lens: 87.5 μm
Focal length of the objective lens: 1.3 mm
Numerical aperture (NA) of the objective lens: 0.855
Thickness of a wedge-shaped mirror: 1.0 mm
Refractive index of the wedge-shaped mirror: 1.53

As shown in FIG. 21, the amount of third-order astigmatism which occurs when the collimating lens is moved in accordance with the thickness of the light-transmitting layer changes depending on the vertex angle α of the wedge-shaped mirror 115 through which a laser beam passes. It is recognized that when the vertex angle α of the wedge-shaped mirror 115 is zero, namely, its incident surface and its reflecting surface are parallel to each other, the change amount of third-order astigmatism is the smallest.

Meanwhile, it is known that when the thickness of the light-transmitting layer of the optical disc changes, an amount of third-order coma aberration which occurs at disc tilt and an amount of third-order coma aberration which occurs at objective lens tilt (hereinafter, also referred to as "lens tilt") changes depending on the thickness of the light-transmitting layer of the optical disc. An amount of third-order coma aberration which occurs when the optical disc is tilted by a predetermined angle (at disc tilt) increases in proportion to the thickness of the light-transmitting layer, and an amount of third-order coma aberration which occurs when the objective lens is tilted by a predetermined angle (at lens tilt) decreases as the thickness of the light-transmitting layer increases.

Therefore, when light is converged on an information recording surface at which the thickness of the light-transmitting layer is large, the objective lens has to be greatly tilted in order to compensate a third-order coma aberration which occurs due to disc till. However, in general, when the objective lens is tilted, a third-order astigmatism occurs in response to the tilt of the objective lens.

In a general optical disc device, as shown in FIG. 22, an optical system is disposed such that the optical axis of the collimating lens 104 coincides with the tangential direction of an optical disc (the CD 70, the DVD 80, the BD 90, or the like). As shown in FIG. 22, a laser beam incident from the tangential direction of the optical disc is reflected by the wedge-shaped mirror 115 and converged by the objective lens 108, or is reflected by the plate-shaped mirror 105 and converged by the compatible objective lens 118. By providing such an arrangement, as shown in FIG. 23, it is made easy to access the innermost portion of the optical disc, and a portion of the optical head which protrudes when the optical head accesses the outermost portion of the optical disc is small.

However, when the optical system is disposed such that the optical axis of the collimating lens 104 coincides with the tangential direction of the optical disc, a third-order astigmatism (first astigmatism) which occurs when the collimating lens 104 is moved along the optical axis direction to compensate a third-order spherical aberration and a third-order astigmatism (second astigmatism) which occurs when the objective lens is tilted in the radial direction of the optical disc to compensate a third-order coma aberration include components of the same directions (0 deg/90 deg directions) and have the same polarity.

As described above, when recording or reproducing is performed on an information recording surface at which the thickness of the light-transmitting layer is large, both the first astigmatism and the second astigmatism increase. Therefore, particularly, in an optical pickup device for a multilayer optical disc having information recording surfaces of three layers or more, there is fear that addition of the first and second astigmatisms greatly influences recording or reproducing.

SUMMARY OF THE INVENTION

It is an object of the present invention to provide an optical system for optical pickup, which can reduce an amount of third-order astigmatism which occurs when recording or reproducing is performed on a multilayer optical disc having information recording surfaces of three layers or more.

The present invention is directed to an optical system for optical pickup, which converges an incident light beam through base plates on at least three recording surfaces located parallel to each other, to form spots corresponding to the recording surfaces, respectively. The optical system for optical pickup of the present invention includes a magnification conversion optical element moving along an optical axis direction in accordance with each recording surface and an objective lens element converging a light beam incident through the magnification conversion optical element, to form a spot on a corresponding recording surface of the recording surfaces, and satisfies the following formula.

$$4.0 \times 10^{-4} < Mn/(tn-tc) \times f < 6.0 \times 10^{-4} \quad (1)$$

Here, tc is the thickness [μm] of the base plate at which a third-order spherical aberration which occurs when a parallel light beam is incident on the objective lens element is the minimum, f is the focal length [mm] of the objective lens element, and Mn is the imaging magnification of the objective lens element when a spot is formed through the base plate having a thickness tn [μm].

According to the present invention, an optical system for optical pickup can be realized in which an amount of third-order astigmatism which occurs when recording or reproducing is performed on a multilayer optical disc having information recording surfaces of three layers or more is reduced.

These and other objects, features, aspects and advantages of the present invention will become more apparent from the following detailed description of the present invention when taken in conjunction with the accompanying drawings.

DESCRIPTION OF THE PREFERRED EMBODIMENTS (Embodiment 1)

Figure 1:
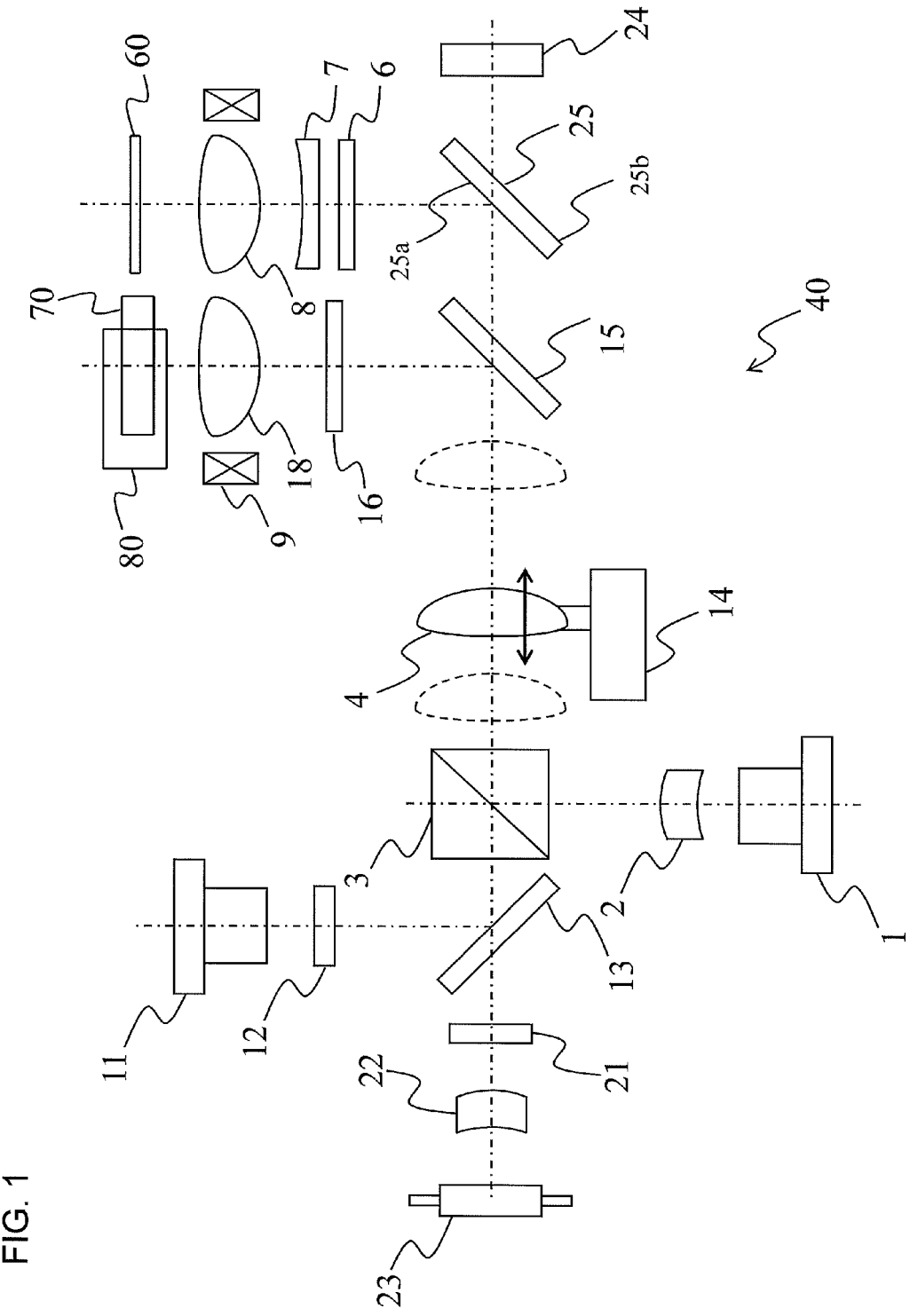
FIG. 1 is a schematic configuration diagram of an optical pickup device including an optical system for optical pickup according to Embodiment 1.
Figure 2:
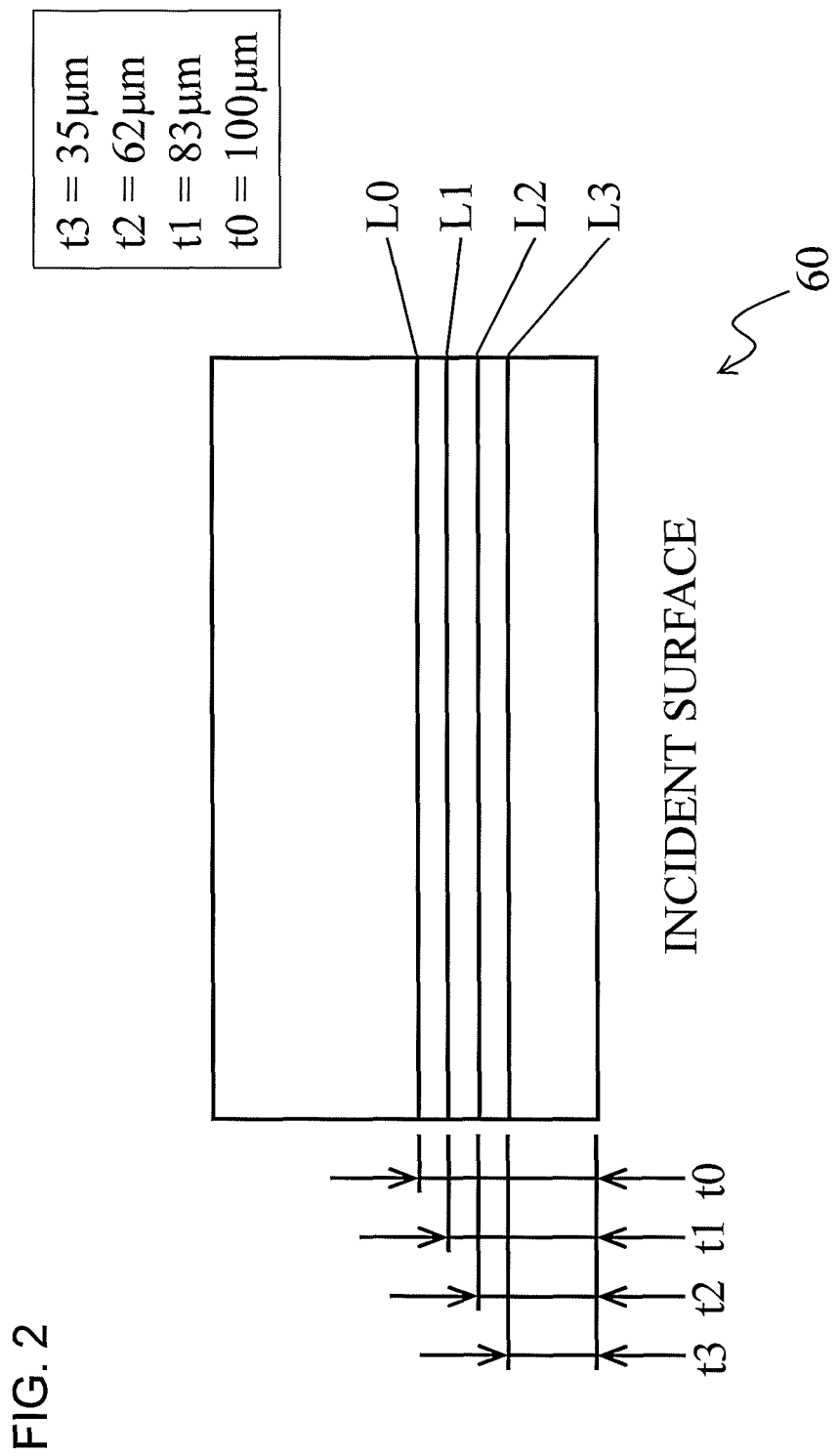
FIG. 2 is a schematic diagram showing the layer configuration of a multilayer optical disc.

FIG. 1 is a schematic configuration diagram of an optical pickup device (optical head) including an optical system for optical pickup according to Embodiment 1. FIG. 2 is a schematic diagram showing the layer configuration of a multilayer optical disc.

The optical pickup device 40 includes a laser beam source 1 which emits a laser beam (e.g., blue-violet light with a wavelength of about 408 nm) for a multilayer optical disc 60, a relay lens 2, a polarizing beam splitter 3, a collimating lens 4, a first plate-shaped mirror 25, a quarter wavelength plate 6, a diffractive lens 7, an objective lens element 8, an objective lens actuator 9, a two-wavelength light source 11 which emits a red laser beam and an infrared laser beam, a diffraction grating 12, a plate type beam splitter 13, a collimating lens actuator 14, a second plate-shaped mirror 15, a quarter wavelength plate 16, a compatible objective lens element 18, a detection hologram 21, a detection lens 22, a photo detector 23, and a front monitor sensor 24. The objective lens element 8 is dedicated for the multilayer optical disc 60. As shown in FIG. 2, the multilayer optical disc 60 has four information recording surfaces L0 to L3, and the thicknesses (t0 to t3) of light-transmitting layers from an incident surface thereof are 35 to 100 µm. The compatible objective lens element 18 is shared by a DVD 70 and a CD 80.

An operation of the optical pickup device 40 which is performed when recording or reproducing is performed on the multilayer optical disc 60 will be described. A laser beam emitted from the laser beam source 1 is converted by the relay lens 2 into diverging light for which NAs are different, and is incident as S-polarized light on the polarizing beam splitter 3. The laser beam reflected by the polarizing beam splitter 3 is converted by the collimating lens 4 into substantially parallel light, passes through the second plate-shaped mirror 15, and is reflected by the first plate-shaped mirror 25 to be bent toward the quarter wavelength plate 6. A portion of the laser beam incident on the first plate-shaped mirror 25 passes through the first plate-shaped mirror 25 and is incident on the front monitor sensor 24. On the basis of output of the front monitor sensor 24, output of the laser beam source 1 is controlled. The laser beam reflected by the first plate-shaped mirror 25 is converted by the quarter wavelength plate 6 into circularly polarized light, then passes through the diffractive lens 7, and is converged by the objective lens element 8 as a light spot on any of the information recording surfaces L0 to L3 of the multilayer optical disc 60.

The laser beam reflected by the information recording surface of the multilayer optical disc 60 passes through the objective lens element 8 and the diffractive lens 7 again, is converted by the quarter wavelength plate 6 into linearly polarized light having a polarization plane different from that in the path to the multilayer optical disc 60, then is reflected by the first plate-shaped mirror 25, and passes through the second plate-shaped mirror 15 and the collimating lens 4. The light emitted from the collimating lens 4 is incident as P-polarized light on the polarizing beam splitter 3, passes through the polarizing beam splitter 3, and is guided to the photo detector 23 via the plate type beam splitter 13, the detection hologram 21, and the detection lens 22. The laser beam detected by the photo detector 23 is photoelectrically converted and then subjected to predetermined arithmetic processing to generate a focus error signal for following surface run-out of the multilayer optical disc 60 and a tracking error signal for following decentering of the multilayer optical disc 60.

Next, an operation of the optical pickup device 40 which is performed when recording or reproducing is performed on the DVD 70 will be described. A red laser beam with a wavelength of about 660 nm, which is emitted from the two-wavelength light source 11, is split by the diffraction grating 12 into a main beam, which is zeroth order light, and sub-beams which are ±1st order diffracted light. The main beam and the sub-beams are incident as S-polarized light on the plate type beam splitter 13, are reflected by the plate type beam splitter 13, pass through the polarizing beam splitter 3, are converted by the collimating lens 4 into converging light, and are reflected by the second plate-shaped mirror 15 to be bent toward the quarter wavelength plate 16. A portion of the laser beam incident on the second plate-shaped mirror 15 passes through the second plate-shaped mirror 15 and the first plate-shaped mirror 25 and is incident on the front monitor sensor 24. On the basis of output of the front monitor sensor 24, output of the red laser beam of the two-wavelength light source 11 is controlled. The laser beam reflected by the second plate-shaped mirror 15 is converted by the quarter wavelength plate 16 into circularly polarized light, and then is converged by the objective lens element 18 as a light spot on an information recording surface of the DVD 70.

The red laser beam reflected by the information recording surface of the DVD 70 passes through the objective lens element 18 again, is converted by the quarter wavelength plate 16 into linearly polarized light having a polarization plane different from that in the path to the DVD 70, then is reflected by the second plate-shaped mirror 15, and passes through the collimating lens 4. The light emitted from the collimating lens 4 is incident as P-polarized light on the polarizing beam splitter 3 and the plate type beam splitter 13, passes therethrough, and is guided to the photo detector 23 via the detection hologram 21 and the detection lens 22. The laser beam detected by the photo detector 23 is photoelectrically converted and then subjected to predetermined arithmetic processing to generate a focus error signal for following surface run-out of the DVD 70 and a tracking error signal for following decentering of the DVD 70.

Next, an operation of the optical pickup device 40 which is performed when recording or reproducing is performed on the CD 80 will be described. An infrared laser beam with a wavelength of about 785 nm, which is emitted from the two-wavelength light source 11, is split by the diffraction grating 12 into a main beam, which is zeroth order light, and sub-beams which are ±1st order diffracted light. The main beam and the sub-beams are reflected by the plate type beam splitter 13, pass through the polarizing beam splitter 3, are converted by the collimating lens 4 into diverging light for which NAs are different, and are reflected by the second plate-shaped mirror 15 to be bent toward the quarter wavelength plate 16. A portion of the laser beam incident on the second plate-shaped mirror 15 passes through the second plate-shaped mirror 15 and the first plate-shaped mirror 25 and is incident on the front monitor sensor 24. On the basis of output of the front monitor sensor 24, output of the infrared laser beam of the two-wavelength light source 11 is controlled. The laser beam reflected by the second plate-shaped mirror 15 passes through the quarter wavelength plate 16 and is converged by the objective lens element 18 as a light spot on an information recording surface of the CD 80.

The infrared laser beam reflected by the information recording surface of the CD 80 passes through the objective lens element 18 and the quarter wavelength plate 16 again, is reflected by the second plate-shaped mirror 15, and passes through the collimating lens 4. The light emitted from the collimating lens 4 passes through the polarizing beam splitter 3 and the plate type beam splitter 13 and is guided to the photo detector 23 via the detection hologram 21 and the detection lens 22. The laser beam detected by the photo detector 23 is photoelectrically converted and then subjected to predetermined arithmetic processing to generate a focus error signal for following surface run-out of the CD 80 and a tracking error signal for following decentering of the CD 80.

<Focus Error Signal Detection and Tracking Error Signal Detection>

For a focus error signal for following surface run-out of the multilayer optical disc 60, it is possible to use the so-called astigmatism method or the like in which a convergence spot to which an astigmatism is provided by the detection lens 22 is detected by means of a four-divided light-receiving pattern within the photo detector 23.

Meanwhile, a tracking error signal for following decentering of the multilayer optical disc 60 can be obtained by detecting zeroth order light and 1st order diffracted light, which are generated when passing through the detection hologram 21, at a predetermined light-receiving region of the photo detector 23. When the tracking error signal obtained thus is used, it is possible to suppress change of the tracking error signal which is caused when the position, width, and depth of an information track formed in the multilayer optical disc 60 vary, and change of the tracking error signal which is caused by reflectivity change caused by information being recorded on an information track. In addition, unnecessary light (stray light) reflected by an information recording surface different from an information recording surface which is targeted for recording or reproducing can also be prevented from being incident on the light-receiving region for detecting a tracking error signal.

It should be noted that the detection of a focus error signal and a tracking error signal is not limited to these detection methods. For example, a tracking error signal may be detected by the differential push-pull method (DPP method) using a main beam and sub-beams generated by the diffraction grating.

Focus error signals for following surface run-out of the DVD 70 and the CD 80 can also be detected by using the so-called astigmatism method or the like in which a convergence spot to which an astigmatism is provided by the detection lens 22 is detected by means of a four-divided light-receiving pattern within the photo detector 23.

Meanwhile, tracking error signals for following decentering of the DVD 70 and the CD 80 are detected by using the so-called three-beam method or differential push-pull method (DPP method) using a main beam and sub-beams generated by the diffraction grating 12.

<Objective Lens Actuator>

In the objective lens actuator 9, an objective lens holder (moveable portion) is supported by a plurality of suspension wires. On the basis of a focus error signal and a tracking error signal, the objective lens actuator 9 drives the objective lens element 8 and the compatible objective lens element 18 in two axial directions (a focus direction and a tracking direction) such that a light spot follows an information track in the rotating multilayer optical disc 60, DVD 70, or CD 80.

It should be noted that, the objective lens actuator 9 is configured to be able to tilt the objective lens element 8 and the compatible objective lens element 18 in the radial direction of the optical disc, in addition to displacement in the focus direction and the tracking direction.

In the present embodiment, a so-called dual-lens configuration is provided in which the objective lens element 8 dedicated for BD and the objective lens element 18 for compatibility with DVD and CD are mounted on one actuator. However, the combination of two objective lens elements is not limited to this example. The combination of two objective lens elements may be a combination of a BD/DVD compatible lens and a lens dedicated for CD or a combination of a BD/CD compatible lens and a lens dedicated for DVD.

Alternatively, only one objective lens element having compatibility with recording and reproducing in three different disc formats may be provided on one actuator. Still alternatively, three objective lenses may be mounted on one actuator. Still alternatively, a plurality of actuators may be provided.

<Collimating Lens Actuator>

The collimating lens 4 is moveable along the optical axis direction of the collimating lens 4 by the collimating lens actuator 14.

Figure 3:
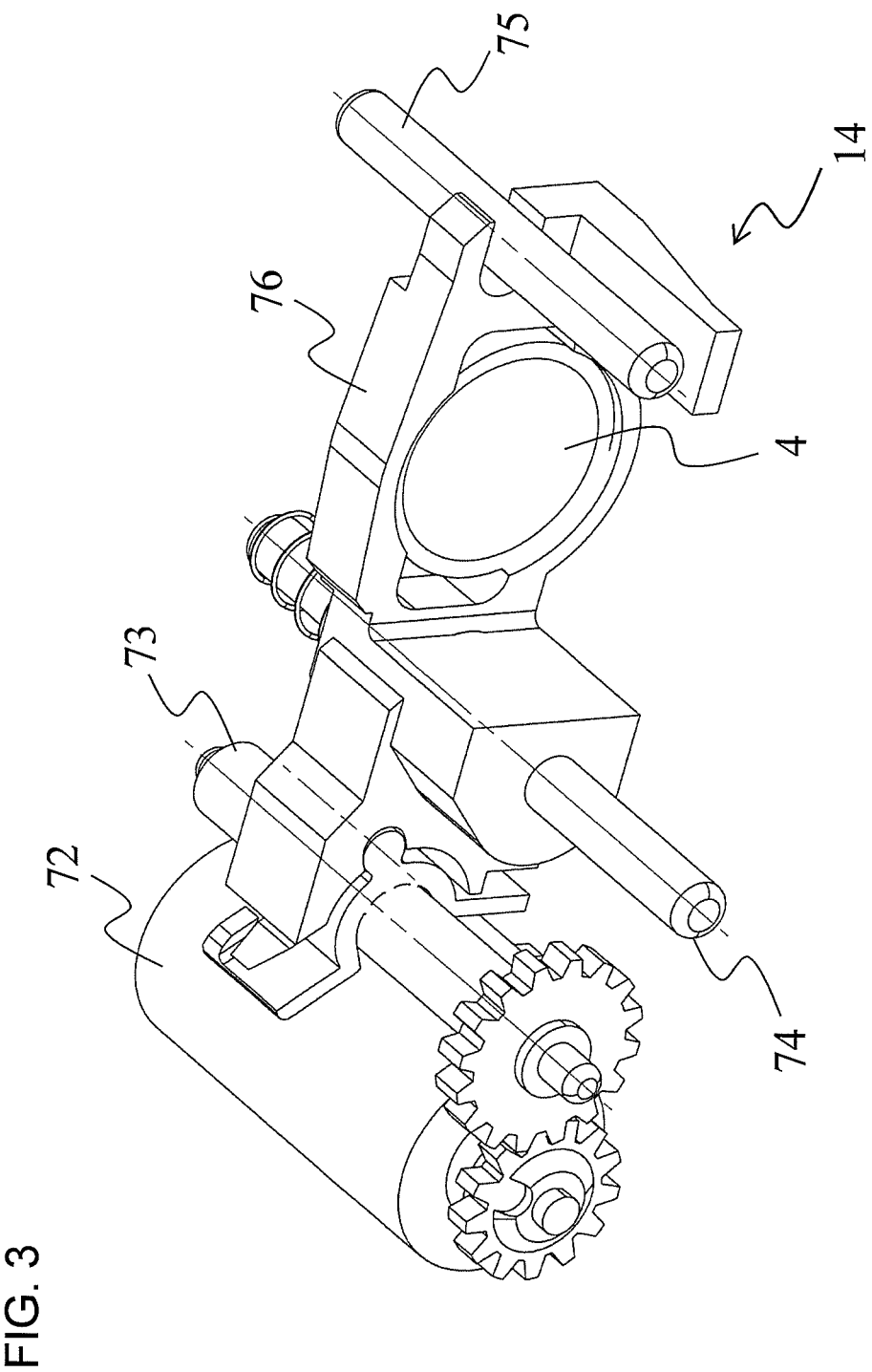
FIG. 3 is a schematic configuration diagram of a collimating lens actuator.

FIG. 3 is a schematic configuration diagram of the collimating lens actuator 14. The collimating lens actuator 14 includes the collimating lens 4, a stepping motor 72, a screw shaft 73, a main shaft 74, a sub-shaft 75, and a lens holder 76. By driving the stepping motor 72 to rotate the screw shaft 73, the lens holder 76 retaining the collimating lens 4 moves the collimating lens 4 along the main shaft 74 and the sub-shaft 75 in the optical axis direction.

Figure 4:
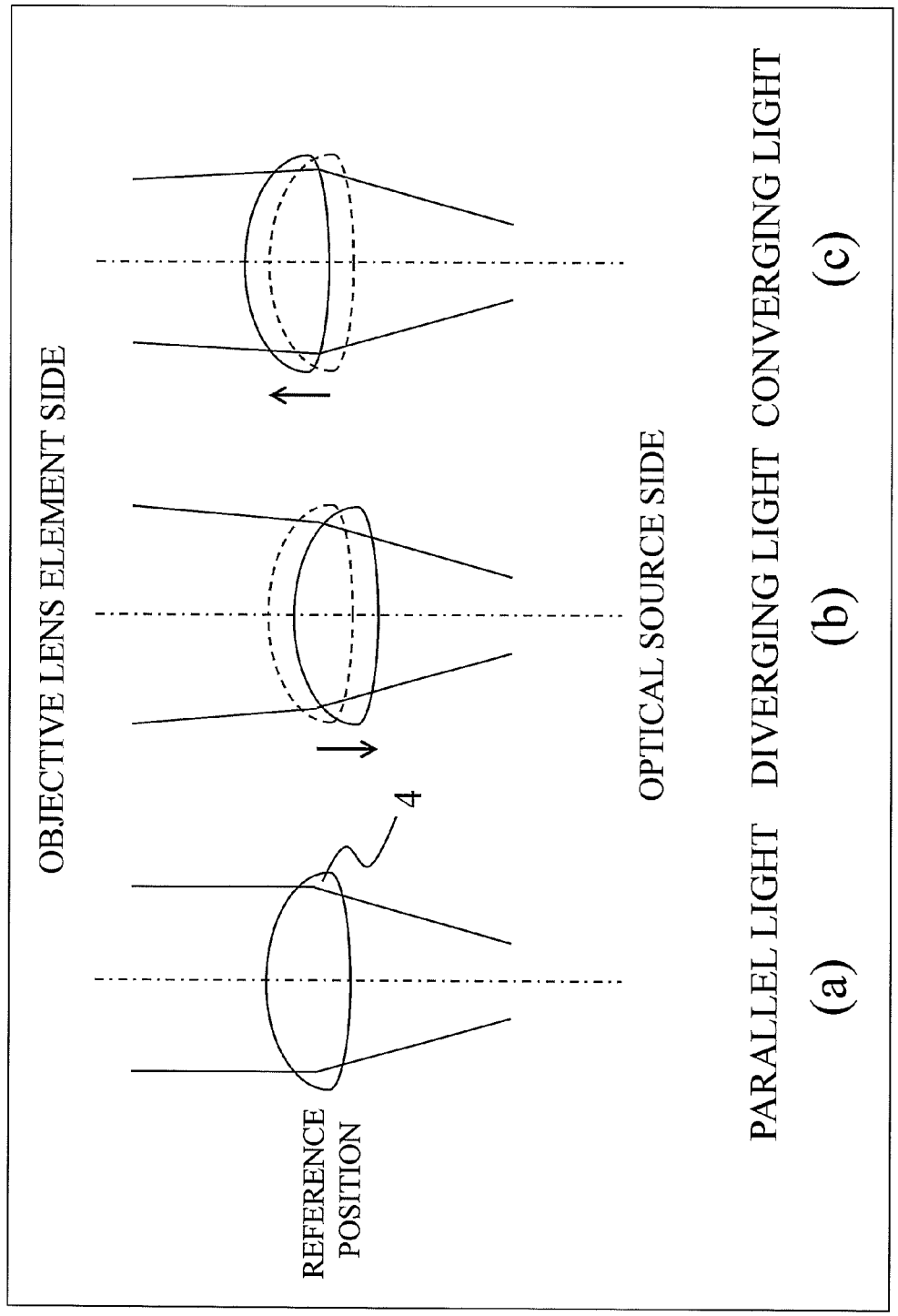
FIG. 4 is a diagram showing parallelism change of a light beam caused by movement of a collimating lens.

FIG. 4 is a diagram showing parallelism change of a light beam caused by movement of the collimating lens 4. By moving the collimating lens 4 toward the light source side of a reference position (FIG. 4(a)) at which light emitted from the collimating lens 4 is substantially parallel light, light emitted from the collimating lens 4 becomes diverging light (FIG. 4(b)), whereby a third-order spherical aberration which occurs when the light-transmitting layer of the multilayer optical disc 60 increases in thickness can be compensated. On the other hand, by moving the collimating lens 4 toward the objective lens element side, light emitted from the collimating lens 4 becomes converging light (FIG. 4(*c*)), whereby a third-order spherical aberration which occurs when the light-transmitting layer of the multilayer optical disc 60 decreases in thickness can be compensated. In other words, in the multilayer optical disc 60 having a plurality of information recording surfaces, by moving the collimating lens 4 in accordance with the thickness of the light-transmitting layer of each information recording surface, a third-order spherical aberration can be compensated.

Giving a detailed description, by moving the collimating lens along the optical axis direction, the parallelism of a light beam incident on the objective lens is changed from parallel to convergence or divergence to shift from parallel. When converging and diverging light is incident on the objective lens element, a spherical aberration occurs in the objective lens element. This spherical aberration and a spherical aberration which occurs due to a thickness error of the light-transmitting layer are cancelled out, and a desired spot is obtained on the information recording surface.

Since the angle of a light beam incident on the objective lens element changes, the imaging magnification (image side distance/object side distance) of the objective lens element changes. In addition, the image side numerical aperture (NA) of the objective lens element also changes at the same time.

In a general objective lens element for BD, the change rate of magnification and the change rate of a spherical aberration are uniquely determined. In addition, since the NA of the objective lens element is specified by the BD standard, an amount of spherical aberration which occurs due to a thickness error of the light-transmitting layer of the disc is also substantially uniquely determined. Thus, the change rate of the imaging magnification or the change rate of NA with respect to the thickness error of the light-transmitting layer of the disc is also uniquely determined.

It should be noted that the configuration of the collimating lens actuator 14 which moves the collimating lens 4 along the optical axis direction is not limited to the configuration using the stepping motor 72 as shown in FIG. 3. For example, the configuration of the collimating lens actuator 14 may be any configuration such as a configuration using drive of a magnetic circuit or a piezoelectric element. In addition, a component which has a collimating function and a function to change the magnification can be similarly used as a collimating lens actuator. Instead of the collimating lens actuator 14, an active element such as a liquid crystal element and a liquid lens may be used. In the configuration using the stepping motor 72 as shown in FIG. 3, it is unnecessary to monitor the position of the collimating lens 4 along the optical axis direction, and the system can be simplified. Meanwhile, the actuator using drive of a magnetic circuit or a piezoelectric element has a small drive portion and thus is suitable for size reduction of the optical pickup device.

<Objective Lens Element for BD>

Figure 5:
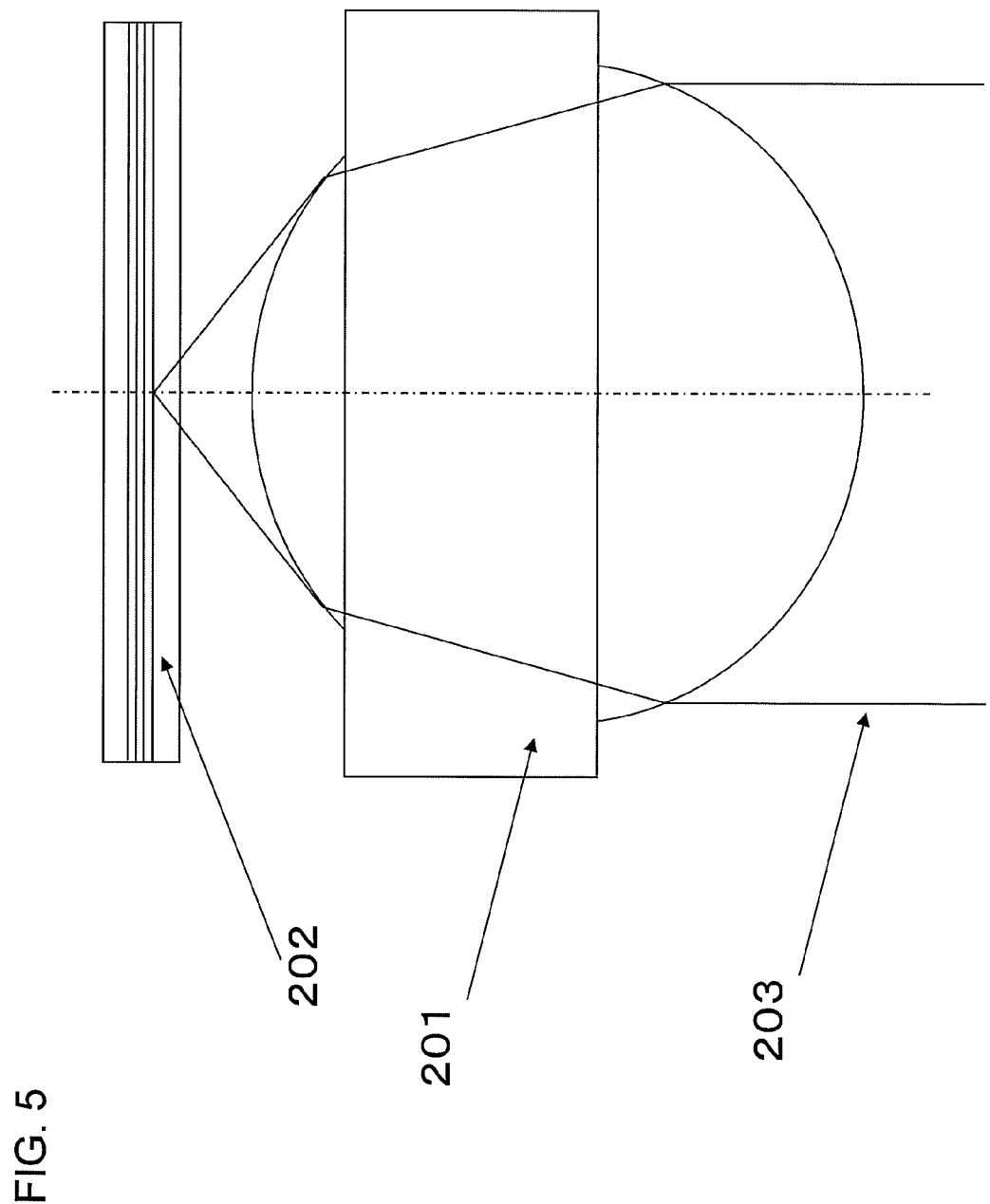
FIG. 5 is a diagram showing a schematic configuration of an objective lens element for BD according to Embodiment 1.

FIG. 5 is a diagram showing a schematic configuration of the objective lens element for BD according to Embodiment 1. A light beam 203 emitted from a light source for BD (which may emit a plurality of wavelengths) is incident on the objective lens element 8 via optical elements disposed on the optical path. The objective lens element 8 has different aspheric surfaces on an incident side and an exit side, respectively. However, the aspheric surfaces are not essential, and the incident side and exit side surfaces suffice to have a function to converge light on an information recording surface of the BD disc 60. For example, a diffractive surface or a phase control surface may be provided on the incident side or exit side surface. Instead of the objective lens element dedicated for BD, a BD/DVD compatible, BD/CD compatible, or BD/DVD/CD compatible objective lens may be used.

When recording or reproducing is performed on a multilayer optical disc, in order to form a desired spot on each information recording surface, the collimating lens is moved along the optical axis direction to diverge or converge a light beam incident on the objective lens element 8, thereby cancelling a generated spherical aberration.

At that time, as described above, the imaging magnification (=image side distance/object side distance) and the image side (optical disc side) numerical aperture (NA) of the objective lens element 8 change. Here, the image side refers to the optical disc side as viewed from the objective lens element 8, and the object side refers to the light source side as viewed from the objective lens element 8. In addition, the sign of the object side distance is set to be negative (minus) when a light beam incident on the objective lens element is converted into diverging light, and to be positive (plus) when a light beam incident on the objective lens element is converted into converging light.

The change rates of the imaging magnification and NA depend on an amount of increase or decrease in the light-transmitting layer thickness from the designed base material thickness. For example, when the imaging magnification of the objective lens element 8 is negative, a light beam emitted from the collimating lens is not parallel light but is diverging light. In this case, a virtual object point is located on the light source side as viewed from the objective lens element 8, and the NA of the objective lens element 8 is low as compared to that when the light beam is parallel light. This state occurs when the light is converged on an information recording surface at which the thickness of the light-transmitting layer thickness is larger than the designed central base material thickness.

On the other hand, when the light is converged on an information recording surface at which the thickness of the light-transmitting layer thickness is smaller than the designed central base material thickness, it is necessary to move the collimating lens along the optical axis direction to cause converging light to be incident on the objective lens element 8 to compensate a spherical aberration. In this case, the virtual object point is located on the optical disc side as viewed from the objective lens element 8, the sign of the object side distance is positive (plus), and the imaging magnification is positive. The NA of the objective lens element 8 is relatively high as compared to that when the light beam is parallel light.

The change rate of the imaging magnification and the change rate of NA depend on the change rate of the thickness of the light-transmitting layer. In a multilayer disc having information recording surfaces of three layers or more, the change rate of the thickness of the light-transmitting layer is high, and thus the change rates of the imaging magnification and NA are also high.

Here, for the objective lens element 8 of the present embodiment, the designed central base material thickness of the optical disc (the thickness of a light-transmitting layer at which a third-order spherical aberration is the minimum ($\approx 0$) when parallel light is incident on the objective lens) is 70 μm. Thus, in order to focus on the information recording surface L0 at which the thickness of the light-transmitting layer is 100 μm or in order to focus on the information recording surface L1 at which the thickness of the light-transmitting layer is 83 μm, diverging light is caused to be incident on the objective lens element 8, thereby compensating a third-order spherical aberration which occurs due to the light-transmitting layer being thicker than the designed light-transmitting layer thickness for the objective lens element 8. Meanwhile, in order to focus on the information recording surface L2 at which the thickness of the light-transmitting layer is 62 µm or in order to focus on the information recording surface L3 at which the thickness of the light-transmitting layer is 35 µm, converging light is caused to be incident on the objective lens element 8, thereby compensating a third-order spherical aberration which occurs due to the light-transmitting layer being thinner than the designed light-transmitting layer thickness for the objective lens element 8.

Next, compensation of a coma aberration will be described. An amount of third-order coma aberration which occurs when the optical disc is tilted by a predetermined angle (at disc tilt) increases in proportion to the thickness of the light-transmitting layer. An amount of third-order coma aberration which occurs when the objective lens is tilted by a predetermined angle (at lens tilt) decreases as the thickness of the light-transmitting layer increases.

Figure 6:
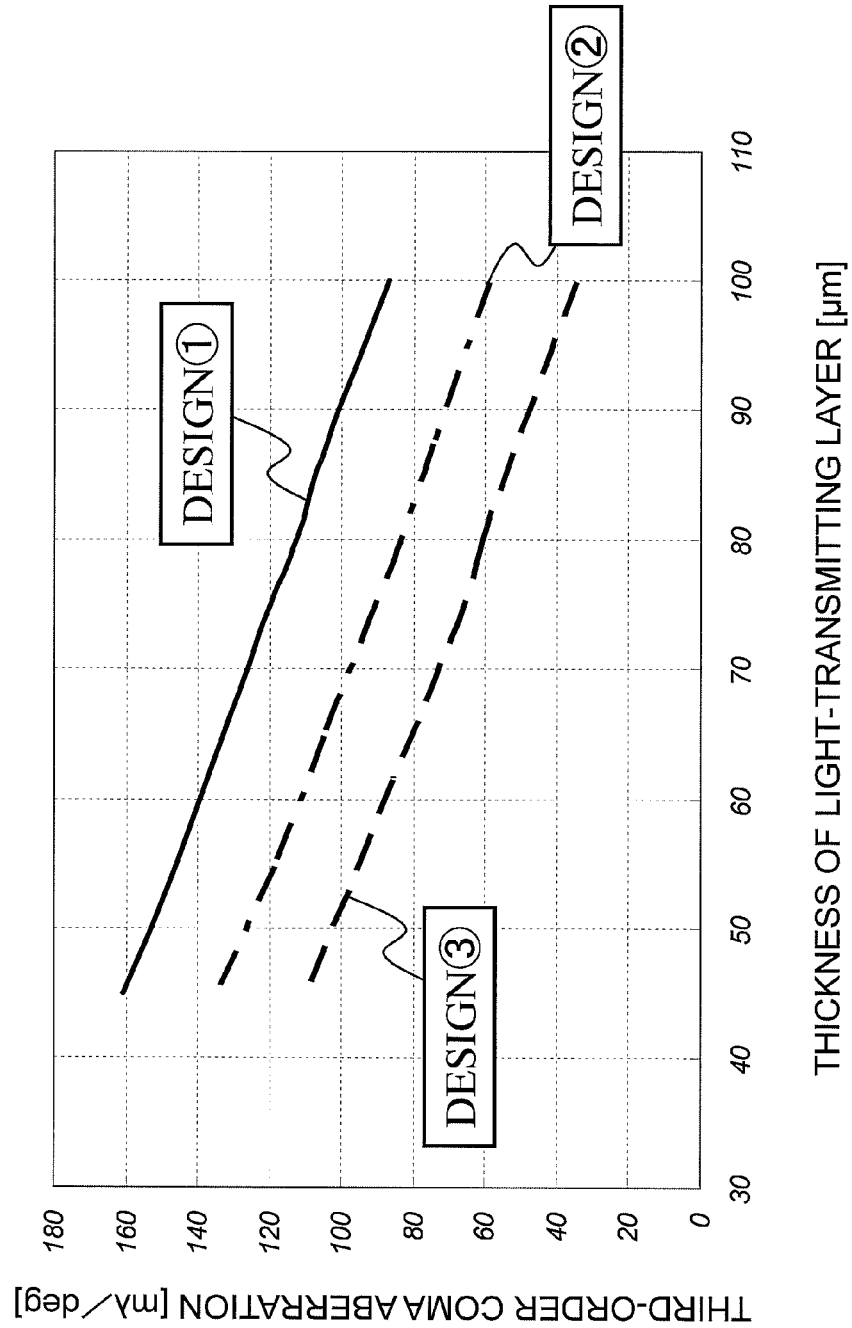
FIG. 6 is a graph showing the relationship between the thickness of a light-transmitting layer and a third-order coma aberration amount in each of three types of differently designed objective lens elements.

FIG. 6 is a graph showing the relationship between the thickness of a light-transmitting layer and a third-order coma aberration amount in each of three types of differently designed objective lens elements. The three types of objective lens elements shown in FIG. 6 are designed such that when a thickness of a light-transmitting layer is 80 µm, amounts of third-order coma aberration which occurs at lens tilt are different from each other. In FIG. 6, the horizontal axis indicates the thickness of the light-transmitting layer, and the vertical axis indicates an amount of third-order coma aberration which occurs when the objective lens is tilted by 1.0 deg (at lens tilt of 1.0 deg).

In each design, an amount of third-order coma aberration which occurs in the case of a light-transmitting layer thickness of 80 µm and lens tilt of 1.0 deg is as follows.

Design (1): 113 mλ
Design (2): 84 mλ
Design (3): 61 mλ

From FIG. 6, it is recognized that the amount of third-order coma aberration which occurs due to lens tilt decreases as the thickness of the light-transmitting layer increases, and this amount changes linearly with respect to the thickness of the light-transmitting layer. For example, a third-order coma aberration which occurs at lens tilt of 1.0 deg in the objective lens element of Design (1) is as follows.

When the thickness of the light-transmitting layer is 55 µm: 146 mλ

When the thickness of the light-transmitting layer is 80 µm: 113 mλ

When the thickness of the light-transmitting layer is 100 µm: 87 mλ

Further, from FIG. 6, it is recognized that in the objective lens elements of Designs (1) to (3), the gradients are uniform in the graph, and thus change of the amount of third-order coma aberration which is caused when the thickness of the light-transmitting layer changes is uniform regardless of the designing conditions.

Figure 7:
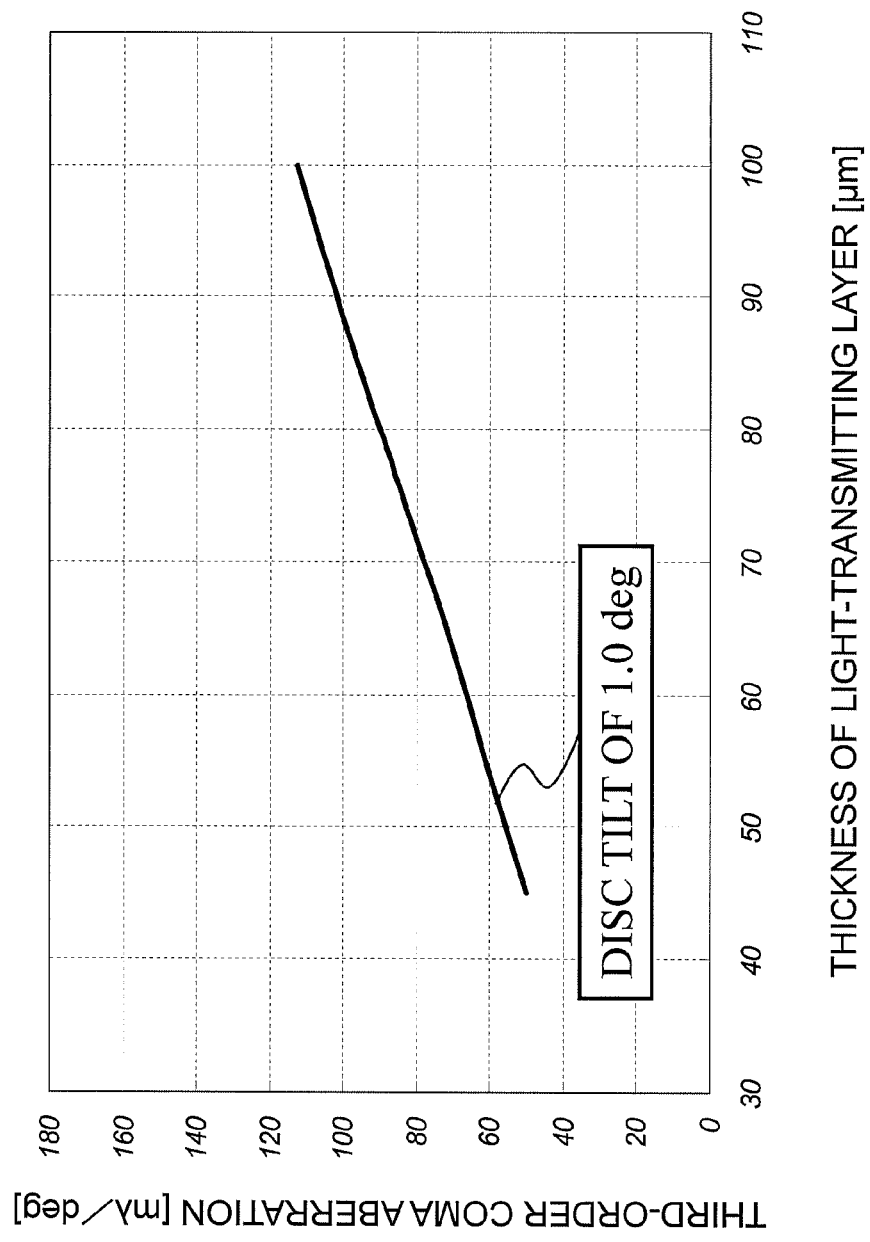
FIG. 7 is a graph showing an amount of third-order coma aberration which occurs when a multilayer optical disc 60 is tilted by 1.0 deg, namely, at disc tilt of 1.0 deg.

FIG. 7 is a graph showing an amount of third-order coma aberration which occurs when the multilayer optical disc 60 is tilted by 1.0 deg, namely, at disc tilt of 1.0 deg. The horizontal axis indicates the thickness of the light-transmitting layer, and the vertical axis indicates an amount of generated third-order coma aberration. The amount of third-order coma aberration which occurs due to disc tilt increases in proportion to the thickness of the light-transmitting layer.

As seen from FIGS. 6 and 7, an amount of lens tilt for compensating a third-order coma aberration which occurs when the multilayer optical disc 60 is tilted by a predetermined angle (at disc tilt) increases as the thickness of the light-transmitting layer increases. For example, when the thickness of the light-transmitting layer is 100 µm, in order to compensate a third-order coma aberration which occurs when the multilayer optical disc 60 is tilted by 0.25 deg, lens tilt of 0.32 deg and lens tilt of 0.48 deg are sufficient in the objective lens element of Design (1) and in the objective lens element of Design (2), respectively, but lens tilt of 0.81 deg is required in the objective lens element of Design (3). However, when the lens is tilted, not only a third-order coma aberration but also a third-order astigmatism occur. A third-order astigmatism which occurs due to lens tilt is substantially uniquely determined by the focal length and the working distance.

Figure 8:
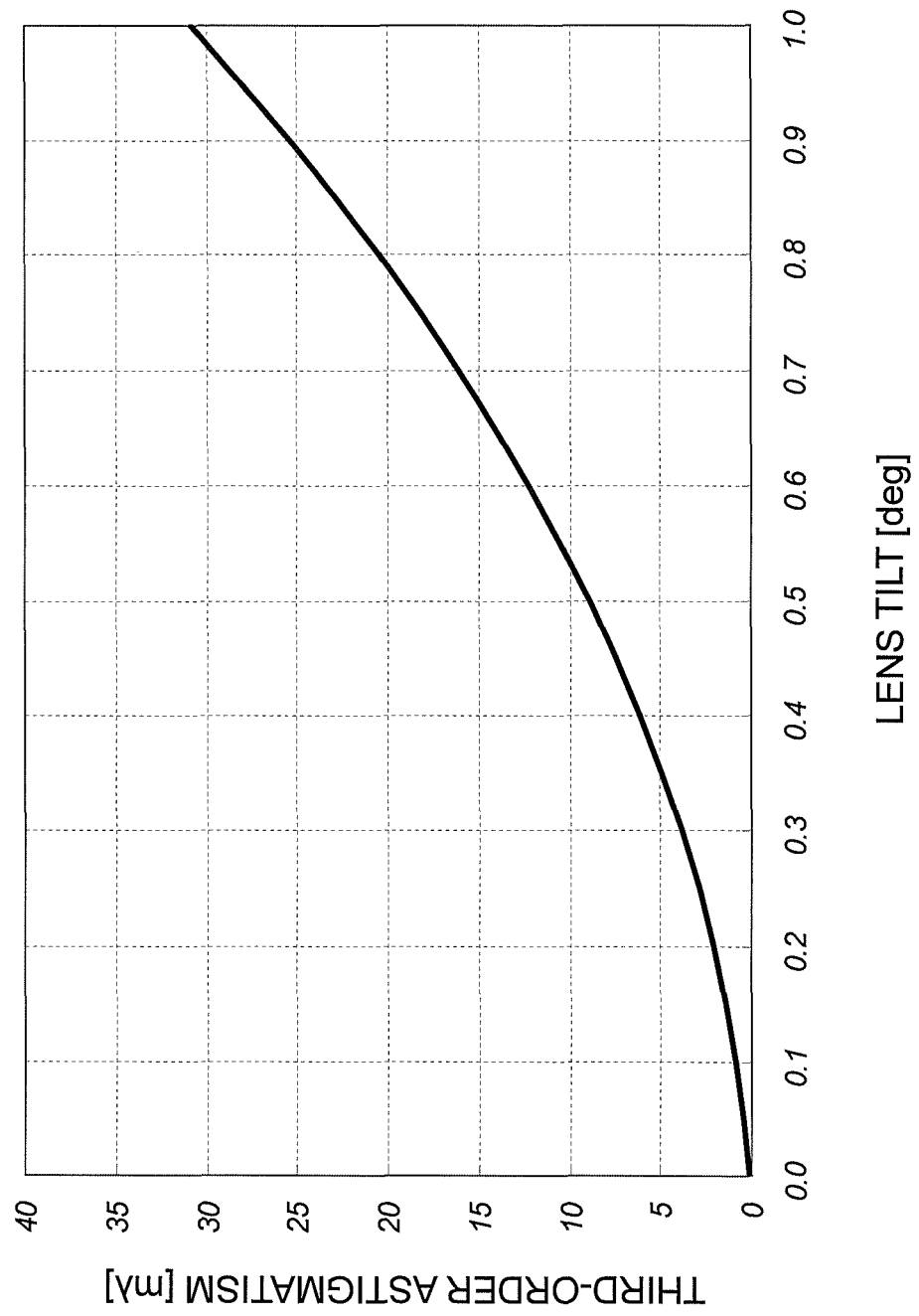
FIG. 8 is a graph showing an amount of third-order astigmatism at lens tilt.

FIG. 8 is a graph showing an amount of third-order astigmatism at lens tilt in each of the above objective lens elements of Designs (1) to (3). In FIG. 8, the horizontal axis indicates a lens tilt angle, and the vertical axis indicates a third-order astigmatism amount. As seen from FIG. 8, the third-order astigmatism amount greatly increases as the lens tilt amount increases, and, for example, reaches 10 mλ when the lens tilt angle exceeds 0.5 deg. When light is converged on an information recording surface at which the thickness of the light-transmitting layer is large, it is necessary to increase the lens tilt amount in order to a third-order coma aberration which occurs due to disc tilt, and thus influence of a third-order astigmatism cannot be neglected.

On the other hand, when light is converged on an information recording surface at which the thickness of the light-transmitting layer is small, the lens tilt amount necessary to compensate a third-order coma aberration which occurs when the multilayer optical disc 60 is tilted is small. For example, when the thickness of the light-transmitting layer is 50 µm, in order to compensate a third-order coma aberration which occurs when the multilayer optical disc 60 is tilted by 0.25 deg, the objective lens elements of Designs (1) to (3) suffice to be tilted by 0.09 deg, 0.11 deg, and 0.14 deg, respectively.

However, when the objective lens is tilted more than assumed due to a lens tilt control error at compensation of third-order coma aberration, resonance of the objective lens actuator, or the like, a third-order coma aberration increases which remains when light is converged on an information recording surface at which the thickness of the light-transmitting layer is small. For example, when there is a control error of ±0.2 deg with respect to a predetermined lens tilt angle, a third-order coma aberration of 31 mλ occurs in the objective lens element of Design (1), a third-order coma aberration of 25 mλ occurs in the objective lens element of Design (2), and a third-order coma aberration of 21 mλ occurs in the objective lens element of Design (3).

According to the above description, in the multilayer optical disc 60, the interval between the information recording surface at which the thickness of the light-transmitting layer is the largest and the information recording surface at which the thickness of the light-transmitting layer is the smallest is large, and thus a factor which deteriorates an aberration is different for each information recording surface. Thus, the objective lens element is designed such that an amount of third-order coma aberration which occurs at lens tilt becomes an appropriate value.

<Compatible Objective Lens>

The compatible objective lens element 18 has a diffraction structure for converging a red laser beam for performing recording or reproducing of information on the DVD 70 and an infrared laser beam for performing recording or reproducing of information on the CD 80, as micro light spots, respectively. This diffraction structure uses the difference in wavelength between the two types of laser beams.

The compatible objective lens element 18 is designed such that: in performing recording or reproducing on the DVD 70, when converging light of a predetermined convergence angle is incident thereon, a third-order spherical aberration is the minimum at a position where the converging light passes through the light-transmitting layer; and in performing recording or reproducing on the CD 80, when diverging light of a predetermined divergence angle is incident on the objective lens element 18, a third-order spherical aberration is the minimum at a position where the diverging light passes through the light-transmitting layer.

For example, the compatible objective lens element 18 of the present embodiment is designed as follows.

DVD
Designed wavelength: 660 nm
Designed light-transmitting layer thickness: 0.6 mm
Focal length: 2.0 mm
Numerical aperture (NA): 0.66
Working distance: 1.0 mm
Object point distance: −150 mm (converging light)
CD
Designed wavelength: 785 nm
Designed light-transmitting layer thickness: 1.2 mm
Focal length: 2.0 mm
Numerical aperture (NA): 0.51
Working distance: 0.65 mm
Object point distance: +150 mm (diverging light)

As shown in FIG. 4, by moving the collimating lens 4 toward the light source side of the reference position (FIG. 4(a)) at which light emitted from the collimating lens 4 is substantially parallel light, light emitted from the collimating lens 4 becomes diverging light of a predetermined divergence angle (a predetermined object point distance), and recording or reproducing of information is performed on the CD 80.

Meanwhile, by moving the collimating lens 4 toward the objective lens side, light emitted from the collimating lens 4 becomes converging light of a predetermined convergence angle (a predetermined object point distance), and recording or reproducing of information is performed on the DVD 70. It should be noted that for the DVD 70 having two information recording surfaces, the collimating lens 4 can be moved in accordance with the thickness of the light-transmitting layer of each information recording surface to compensate a third-order spherical aberration.

<Moveable Range of Collimating Lens>

Figure 9:
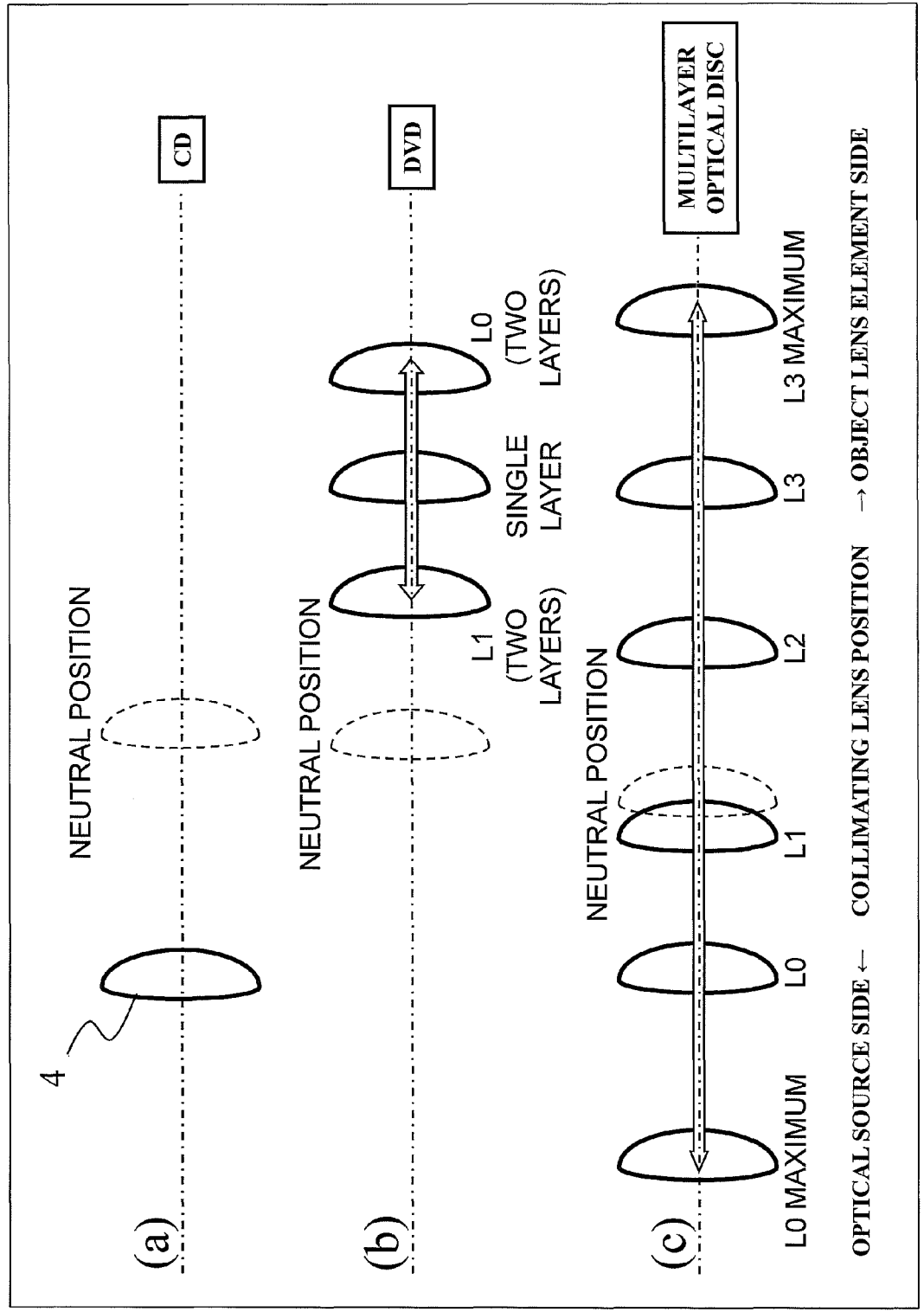
FIG. 9 is a schematic diagram showing a moveable range of the collimating lens 4.

FIG. 9 is a schematic diagram showing a moveable range of the collimating lens 4. FIGS. 9(a) to 9(c) each show a moveable range when recording or reproducing is performed on CD, DVD, or a multilayer optical disc. In FIG. 9, neutral positions (reference positions) indicated by broken lines are different from each other, since the wavelengths of the laser beams used for recording or reproducing on the CD 80, the DVD 70, and the multilayer optical disc 60 are different from each other.

FIG. 9(a) shows a position of the collimating lens 4 when recording or reproducing is performed on the CD 80. The compatible objective lens element 18 of the present embodiment is designed such that in performing recording or reproducing on a CD having a light-transmitting layer thickness of 1.2 mm, a third-order spherical aberration becomes optimum when diverging light of an object point distance of +150 mm is incident thereon. Thus, by moving the collimating lens 4 toward the light source side of the neutral position indicated by the broken line, diverging light is caused to be incident on the compatible objective lens element 18. Since the numerical aperture NA for the CD 80 is low as compared to those for the DVD 70 and the multilayer optical disc 60, recording or reproducing can be performed on the CD 80 in a state where the collimating lens 4 is fixed at a predetermined position.

FIG. 9(b) shows a position of the collimating lens 4 when recording or reproducing is performed on the DVD 70. The compatible objective lens element 18 of the present embodiment is designed such that in performing recording or reproducing on a DVD having a light-transmitting layer thickness of 0.6 mm, a third-order spherical aberration becomes optimum by causing converging light of an object point distance of −150 mm to be incident thereon. Thus, by moving the collimating lens 4 toward the objective lens side of the neutral position indicated by the broken line, converging light is caused to be incident on the compatible objective lens element 18.

As media of the DVD 70, in addition to a single-layer disc having a single information recording surface, a two-layer disc having information recording surfaces of two layers has been put into practical use. A two-layer disc is composed of an information recording surface L1 and an information recording surface L0, the light-transmitting layer thickness on the information recording surface L0 is about 0.58 mm, and the light-transmitting layer thickness on the information recording surface L1 is about 0.62 mm. When the thickness of the light-transmitting layer on the information recording surface is different from the designed light-transmitting layer thickness (0.6 mm), a third-order spherical aberration occurs. Thus, for the DVD 70 for which the numerical aperture NA is high as compared to that for the CD 80, it is preferred to move the collimating lens 4 to a predetermined position corresponding to (the thickness of the light-transmitting layer of) an information recording surface targeted for recording or reproducing of information.

FIG. 9(c) shows a position of the collimating lens 4 when recording or reproducing is performed on the multilayer optical disc 60. For the objective lens element 8 of the present embodiment, the designed light-transmitting layer thickness is 70 μm. When recording or reproducing is performed on the information recording surface L0 at which the thickness of the light-transmitting layer is 100 μm or on the information recording surface L1 at which the thickness of the light-transmitting layer is 83 μm, the collimating lens 4 is moved toward the light source side of the neutral position indicated by the broken line, to cause diverging light to be incident on the objective lens element 8. Meanwhile, when recording or reproducing is performed on the information recording surface L2 at which the thickness of the light-transmitting layer is 62 μm or on the information recording surface L3 at which the thickness of the light-transmitting layer is 35 μm, the collimating lens 4 is moved toward the objective lens element 8 side to cause converging light to be incident on the objective lens element 8. By such movement of the collimating lens 4, a third-order spherical aberration which occurs due to the thickness of the light-transmitting layer being different from the designed light-transmitting layer thickness can be compensated.

For the multilayer optical disc 60, the numerical aperture NA is very high as compared to those for the CD 80 and the DVD 70. Thus, in addition to moving the collimating lens 4 so as to correspond to the thickness of the light-transmitting layer of the information recording surface, it is preferred to also compensate a third-order spherical aberration which occurs due to variation of the thickness of each light-transmitting layer, temperature change, or the like. As shown in FIG. 9(c), the optical pickup device 40 according to the present embodiment sets a moveable range (L0 maximum to L3 maximum) of the collimating lens 4 such that in addition to a third-order spherical aberration which depends on each of the thicknesses of the light-transmitting layers on the information recording surface L0 and the information recording surface L3, a third-order spherical aberration which occurs due to variation of the thickness of each light-transmitting layer, temperature change, or the like can also be compensated.

Figure 10:
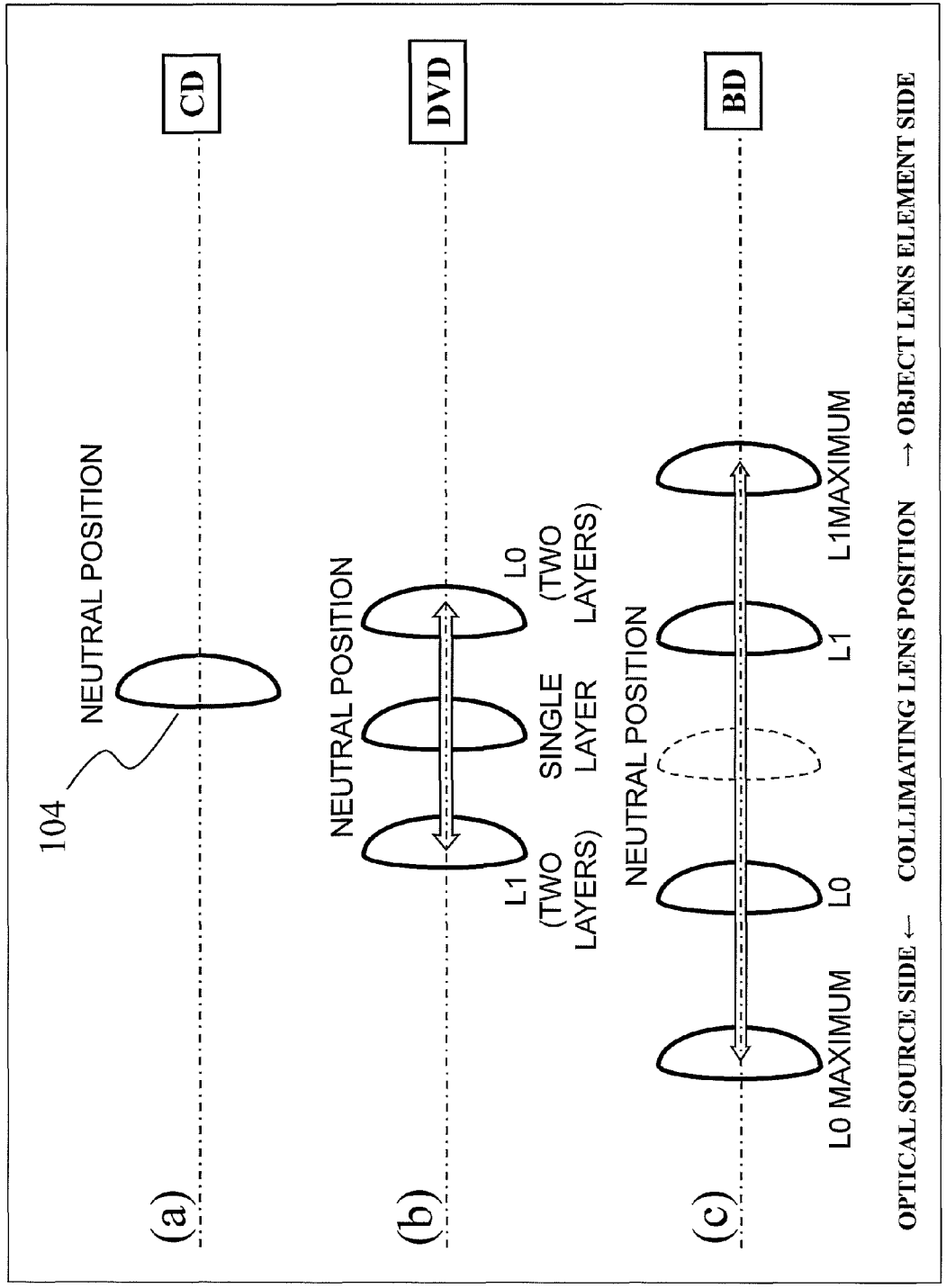
FIG. 10 is a diagram schematically showing a moveable range of the collimating lens 4 in a conventional optical head 140 (FIG. 12)
Figure 22:
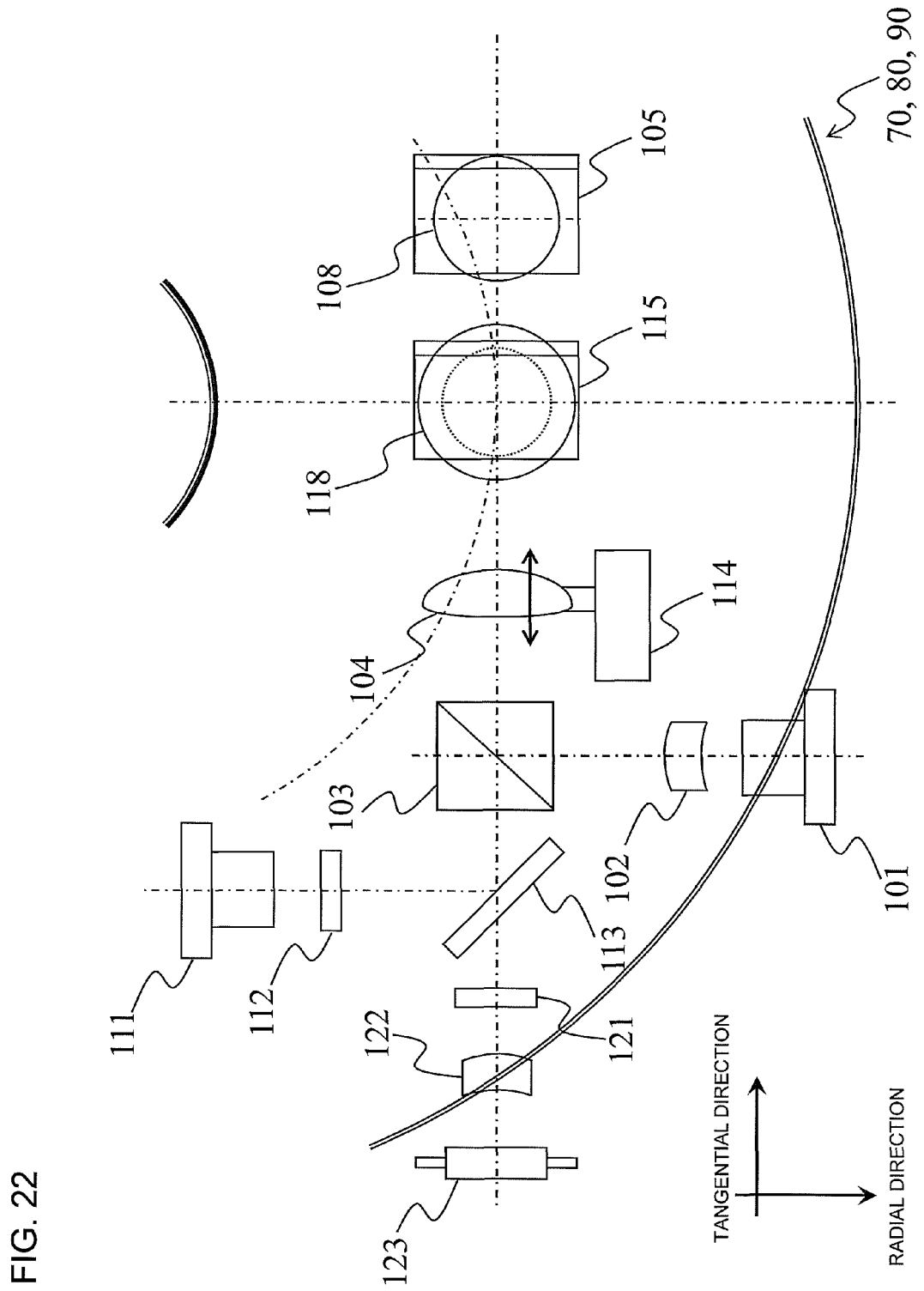
FIG. 22 is a diagram showing the positional relationship between an optical disc and an optical system for optical pickup.
Figure 23:
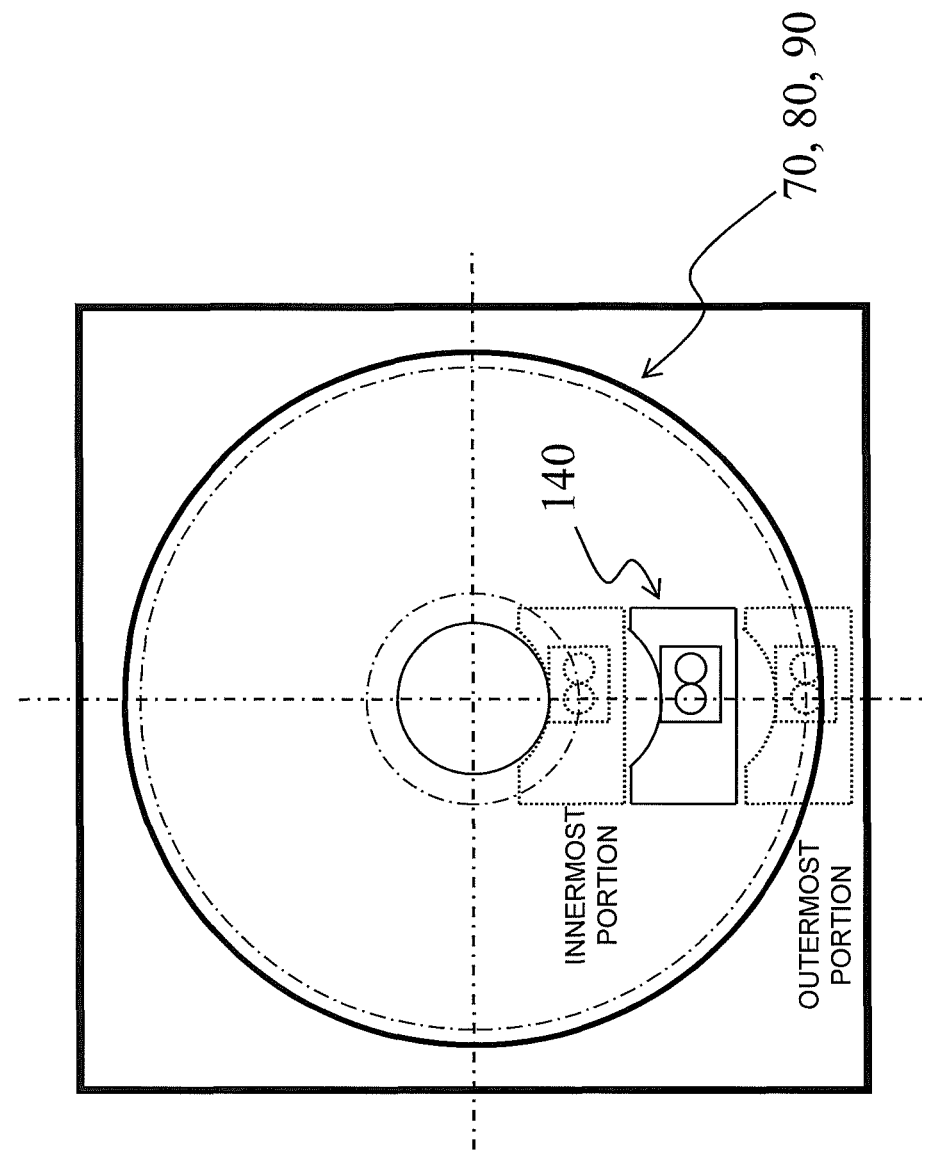
FIG. 23 is a diagram illustrating movement of the optical pickup device in the radial direction of the optical disc.

FIG. 10 is a diagram schematically showing a moveable range of the collimating lens 104 in the conventional optical head 140 (FIG. 22). FIGS. 10(a), 10(b), and 10(c) each show a moveable range when recording or reproducing is performed on CD, DVD, and a multilayer optical disc, respectively. It is recognized that the moveable range of the collimating lens 104 shown in FIG. 10 is greatly different from the moveable range of the collimating lens 4 according to the present embodiment.

<Plate-Shaped Mirror>

The second plate-shaped mirror 15 mostly reflects an infrared laser beam and a red laser beam emitted from the collimating lens 4 to bend the laser beams toward the compatible objective lens element 18, and passes substantially the entirety of a blue-violet laser beam for BD to cause the laser beam to be incident on the first plate-shaped mirror 25.

Specifically, a reflective film having wavelength selectivity is formed on the incident side surface (first surface) of the second plate-shaped mirror 15. The reflective film has a characteristic to reflect 90% of an infrared laser beam and a red laser beam which are incident at an incident angle of about 45 deg, pass 10% thereof, and pass almost 100% of a blue laser beam.

Meanwhile, on the exit side surface (second surface) of the second plate-shaped mirror 15, an AR (Anti-Reflection) coat corresponding to the three wavelengths of the blue-violet laser beam, the red laser beam, and the infrared laser beam is provided in order to suppress internal reflection.

The first plate-shaped mirror 25 mostly reflects a blue-violet laser beam emitted from the collimating lens 4 to bend the laser beam toward the objective lens element 8, and passes the remaining portion of the blue-violet laser beam and substantially the entireties of a red laser beam and an infrared laser beam to cause the laser beams to be incident on the front monitor sensor 24.

Specifically, a reflective film having wavelength selectivity is formed on the incident side surface (first surface) of the first plate-shaped mirror 25. The reflective film has a characteristic to reflect 90% of a blue-violet laser beam incident at an incident angle of about 45 deg, pass 10% thereof, and pass almost 100% of a red laser beam and an infrared laser beam.

Meanwhile, on the exit side surface (second surface) of the first plate-shaped mirror 25, an AR coat corresponding to the three wavelengths of the blue-violet laser beam, the red laser beam, and the infrared laser beam is provided.

Figure 11:
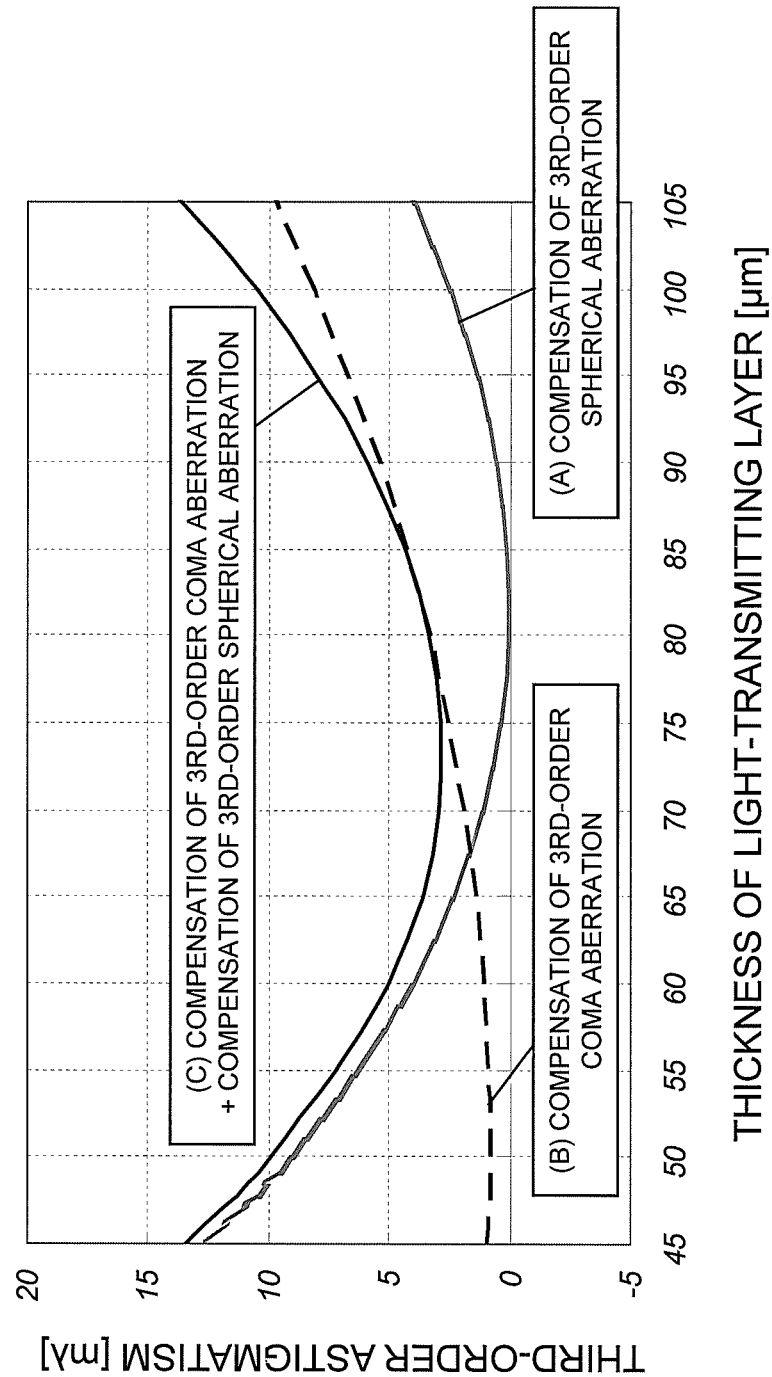
FIG. 11 is a diagram showing change of a third-order astigmatism when the collimating lens 4 is moved in accordance with the thickness of a light-transmitting layer.
Figure 12:
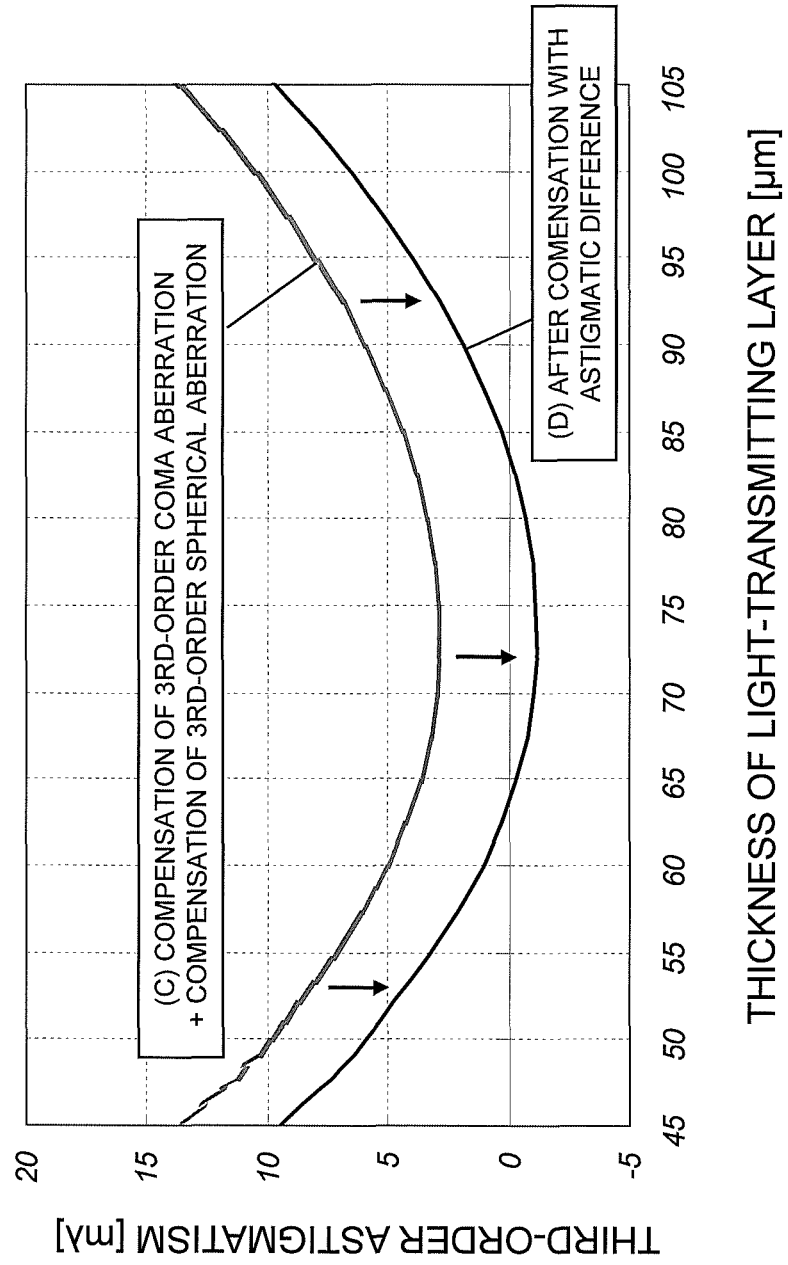
FIG. 12 is a diagram showing change of a third-order astigmatism when the collimating lens 4 is moved in accordance with the thickness of a light-transmitting layer.

FIGS. 11 and 12 are diagrams showing change of a third-order astigmatism when the collimating lens 4 is moved in accordance with the thickness of the light-transmitting layer. In FIGS. 11 and 12, the horizontal axis indicates the thickness of the light-transmitting layer, and the vertical axis indicates an amount of third-order astigmatism.

In performing recording or reproducing on the multilayer optical disc 60, when the collimating lens 4 is moved along the optical axis direction in order to compensate a third-order spherical aberration which occurs in accordance with the thickness of the light-transmitting layer, non-parallel light (diverging light or converging light) is incident on the second plate-shaped mirror 15 and a third-order astigmatism occurs.

In FIG. 11, (A) represents a third-order astigmatism which occurs when the collimating lens 4 is moved in order to compensate a third-order spherical aberration. The third-order astigmatism which occurs at compensation of third-order spherical aberration is the minimum (=0) when the light-transmitting layer thickness is 70 µm which is the designed light-transmitting layer thickness, since parallel light is incident on the second plate-shaped mirror 15. As the light-transmitting layer thickness shifts away from the designed light-transmitting layer thickness of 70 µm, namely, non-parallelism of the blue-violet laser beam incident on the second plate-shaped mirror 15 increases, the third-order astigmatism increases. For the multilayer optical disc 60 having information recording surfaces of three layers or more, the moveable range of the collimating lens 4 increases as shown in FIG. 9, and thus change of the amount of third-order astigmatism which occurs in accordance with the thickness of the light-transmitting layer also increases.

Here, for the objective lens element 8 of the present embodiment, the designed light-transmitting layer thickness is 70 µm. Thus, as shown in FIG. 8, the moveable range of the collimating lens 4 is wide on the objective lens element side of the neutral position and is narrow on the light source side of the neutral position. In other words, a range in which a laser beam incident on the objective lens element 8 is converging light is wide, and a range in which a laser beam incident on the objective lens element 8 is diverging light is narrow.

Therefore, when recording or reproducing is performed on the multilayer optical disc 60 having the four information recording surfaces L0 to L3 (FIG. 2) having the light-transmitting layer thicknesses t0 to t3, an amount of third-order astigmatism is large on the L3 side on which the thickness of the light-transmitting layer is small, and is small on the L0 side on which the thickness of the light-transmitting layer is large, as shown in (A) of FIG. 11.

Meanwhile, as described above, an amount of third-order coma aberration which occurs when the optical disc is tilted by a predetermined angle (at disc tilt) increases in proportion to the thickness of the light-transmitting layer, and an amount of third-order coma aberration which occurs when the objective lens is tilted by a predetermined angle (at lens tilt) decreases as the thickness of the light-transmitting layer increases. Thus, as the thickness of the light-transmitting layer increases, a lens tilt amount for compensating a third-order coma aberration which occurs at disc tilt increases, and an amount of third-order astigmatism increases accordingly.

In FIG. 11, (B) represents change of a third-order astigmatism amount when a third-order coma aberration which occurs at disc tilt of 0.25 deg is compensated by lens tilt. From (B) of FIG. 11, it is recognized that as the thickness of the light-transmitting layer increases, an amount of third-order astigmatism increases.

In the optical system for optical pickup according to the present embodiment, similarly to a conventional optical disc device (see FIG. 22), the collimating lens 4 is disposed such that the optical axis direction thereof coincides with the tangential direction of the optical disc. Thus, a third-order astigmatism which occurs when the objective lens element 8 is tilted in the radial direction of the optical disc to compensate a third-order coma aberration, and a third-order astigmatism which occurs when the collimating lens 4 is moved along the optical axis direction to compensate a third-order spherical aberration, include components of the same directions (0 deg/90 deg directions) and have the same polarity.

The optical pickup device according to the present embodiment is designed such that a third-order astigmatism ((A) of FIG. 11) which occurs when a third-order spherical aberration is compensated is smaller on the L0 side on which the thickness of the light-transmitting layer is large, than on the L3 side on which the thickness of the light-transmitting layer is small. Thus, the sum ((C) of FIG. 11) of: the third-order astigmatism ((A) of FIG. 11) which occurs when a third-order spherical aberration is compensated; and the third-order astigmatism ((B) of FIG. 11) which occurs when a third-order coma aberration is compensated by lens tilt, is substantially equal between L3 (t3=50 μm) at which the thickness of the light-transmitting layer is small and L0 (t0=100 μm) at which the thickness of the light-transmitting layer is large. By providing such a configuration, increase of a third-order astigmatism can be suppressed, in particular, when recording or reproducing is performed on an information recording surface at which the thickness of the light-transmitting layer is large.

Meanwhile, in a general semiconductor laser, an astigmatic difference is present, and thus a third-order astigmatism also occurs due to the astigmatic difference. As shown in FIG. 1, the optical pickup device according to the present embodiment causes the laser beam emitted from the laser beam source 1, to be incident as S-polarized light on the polarizing beam splitter 3. Thus, the aforementioned third-order astigmatism ((A) of FIG. 11) which occurs when a third-order spherical aberration is compensated, and the aforementioned third-order astigmatism ((B) of FIG. 11) which occurs when a third-order coma aberration is compensated by lens tilt, include components of the same directions (0 deg/90 deg directions) as that of a third-order astigmatism which occurs due to an astigmatic difference of the laser beam source 1, and have polarity opposite to that of this third-order astigmatism.

Therefore, the third-order astigmatism sum shown in (C) of FIG. 11 is cancelled with the third-order astigmatism which occurs due to the astigmatic difference of the laser beam source 1. The third-order astigmatism compensated by the astigmatic difference of the laser beam source 1 can be further reduced as shown in (D) of FIG. 12.

As described above, by widening the range in which a laser beam incident on the objective lens element 8 is converging light and narrowing the range in which a laser beam incident on the objective lens element 8 is diverging light, a range in which a laser beam incident on the compatible objective lens element 18 is converging light is widened. Thus, as shown in FIG. 9(b), designing is possible in which, in performing recording or reproducing on the DVD 70, even when a third-order spherical aberration which occurs in accordance with the thickness of the light-transmitting layer is compensated, the collimating lens 4 is constantly located on the objective lens side of the neutral position. By performing such designing, a red laser beam is constantly incident as converging light on the second plate-shaped mirror 15, and thus interference of the laser beam within an effective region of the front monitor sensor 24 can be suppressed.

Meanwhile, when recording or reproducing is performed on the CD 80, it is unnecessary to move the collimating lens 4, and thus the collimating lens 4 may be designed such that a laser beam incident on the compatible objective lens element 18 becomes diverging light by using the collimating lens 4 on the light source side of the neutral position. Alternatively, the collimating lens 4 may be designed such that a laser beam incident on the compatible objective lens element 18 becomes converging light by using the collimating lens 4 on the compatible objective lens element 18 side of the neutral position.

In either case, an infrared laser beam is incident as diverging light or converging light on the second plate-shaped mirror 15, and thus interference of the laser beam within the effective region of the front monitor sensor 24 can be suppressed. When designing is performed such that a laser beam incident on the compatible-objective lens element 18 becomes diverging light, the working distance (WD) can be increased in performing recording or reproducing on the CD 80. In addition, when designing is performed such that a laser beam incident on the compatible objective lens element 18 becomes converging light, a moving amount of the collimating lens 4 when switching the optical disc targeted for recording or reproducing from CD to DVD or from DVD to CD can be small, and thus the start-up time and the operating time can be shortened.

As described above, the optical pickup device according to the present embodiment is configured such that the moveable range of the collimating lens in performing recording or reproducing on the multilayer optical disc 60 is wide on the objective lens element 8 side of the neutral position and is narrow on the light source side of the neutral position. Thus, in particular, when recording or reproducing is performed on an information recording surface at which the thickness of the light-transmitting layer is large, increase of a third-order astigmatism can be suppressed, and recording or reproducing of information can be favorably performed on the multilayer optical disc.

In the present embodiment, the four-layer optical disc having the information recording surfaces L0 to L3 at which the thickness of the light-transmitting layer is 100 μm to 35 μm has been described as a multilayer optical disc. However, the multilayer optical disc is not limited to such a configuration, and it will be understood that the present invention is widely applicable to multilayer optical discs having information recording surfaces of three layers or more.

Further, in the present embodiment, the optical pickup device which performs recording or reproducing on the three types of optical discs, namely, the multilayer optical disc, DVD, and CD, has been described. However, application of the present invention is not limited to such an optical pickup device. For example, it is obvious that the optical system of the present embodiment is capable of favorably performing recording or reproducing of information also on a single-layer BD, in addition to the multilayer optical disc, DVD, and CD.

Further, use of a compatible objective lens dedicated for DVD as the compatible objective lens for performing recording or reproducing on DVD and CD allows recording or reproducing of information to be favorably performed on the multilayer optical disc, 13D, and DVD.

(Embodiment 2)

Figure 13:
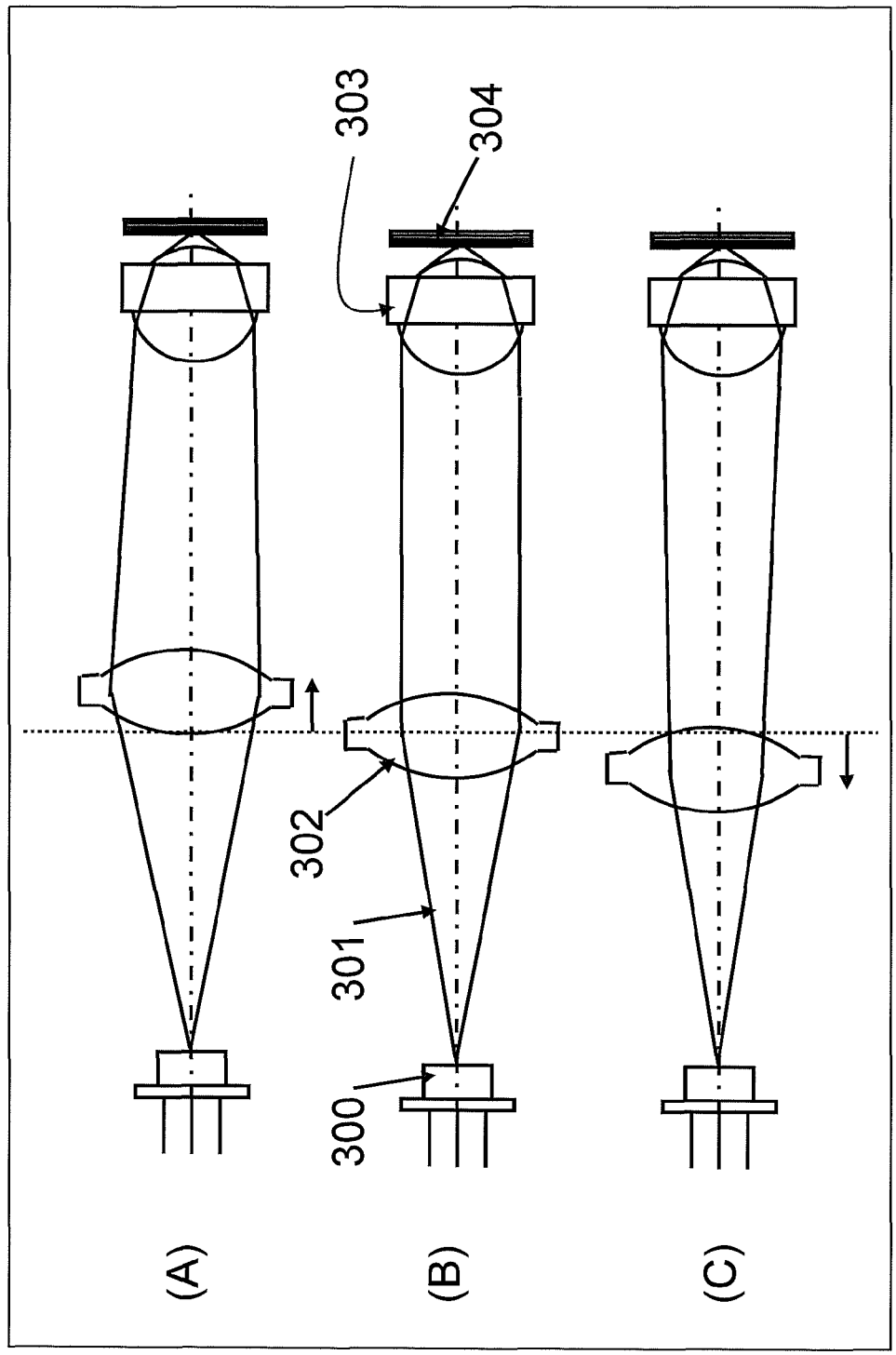
FIG. 13 is a schematic configuration diagram of an optical system for optical pickup according to Embodiment 2.

FIG. 13 is a schematic configuration diagram of an optical system for optical pickup according to Embodiment 2. FIG. 13 shows only main optical elements partially constituting an optical system for BD. As shown in FIG. 13(B), a light beam 301 having a blue wavelength is emitted from a light source 300, is converted by a collimating lens 302 into substantially parallel light, and is incident on an objective lens element 303. The light beam 301 having passed through the objective lens element 303 is favorably converged on one of a plurality of information recording surfaces of an optical disc 304.

The objective lens element 303 has two different aspheric surfaces on an incident side and an exit side, respectively. The objective lens element 303 may have a diffractive surface or a phase control surface. In addition, in the present embodiment, the objective lens element 303 is dedicated for BD, but may be a lens compatible with BD and another optical disc (DVD or CD).

Further, the collimating lens 302 may be any lens as long as it has a collimating function. Instead of the collimating lens 302, for example, a liquid crystal element or a liquid lens may be used. The collimating lens 302 is moveable along the optical axis direction. By moving the position of the collimating lens 302 along the optical axis direction in accordance with an information recording surface targeted for light convergence, the parallelism of a light beam made incident on the objective lens element 303 can be changed from parallel to divergence or convergence. By moving the collimating lens 302 as described above, a spherical aberration which occurs when the light-transmitting layer thickness is different from the designed base material thickness can be cancelled out and a reduced spherical aberration can be generated.

By providing the configuration described above, a desired spot having a small aberration can be obtained on each of the information recording surfaces.

Further, the multilayer disc 304 has information recording surfaces L0, L1, L2, and L3 of four layers in order from the far side of a front surface thereof (a surface located so as to face the objective lens element 303). The thicknesses of the light-transmitting layers are 100 μm (L0), 85 μm (L1), 65 μm (L2), and 45 μm (L3).

Further, the designed central base material thickness for the objective lens element 303 according to the present embodiment is 75 μm. When recording or reproducing is performed on the information recording surface L3 or L2 at which the light-transmitting layer is thinner than the designed central base material thickness, it is necessary to move the collimating lens 302 toward the objective lens element 303 as shown in FIG. 13(A), to cause converging light to be incident on the objective lens element 303. In this case, the sign of a virtual object point distance is positive (plus), and thus the imaging magnification of the objective lens element 303 has a positive (plus) value and the NA of the objective lens element 303 is relatively high.

On the other hand, when recording or reproducing is performed on the information recording surface L1 or L0 at which the light-transmitting layer is thicker than the designed central base material thickness, it is necessary to move the collimating lens 302 away from the objective lens element 303 as shown in FIG. 13(C), to cause diverging light to be incident on the objective lens element 303. In this case, the sign of a virtual object point distance is negative (minus), and thus the imaging magnification of the objective lens element 303 has a negative (minus) value and the NA of the objective lens element 303 is relatively low. As described above, the imaging magnification and NA of the objective lens element 303 change depending on a difference from the designed central base material thickness.

It should be noted in Embodiments 1 and 2 described above, an objective optical system composed of two or more lenses may be used instead of the single objective lens element.

Hereinafter, conditions which to be satisfied by the objective lens element included in the optical system for optical pickup according to the present invention, will be described.

The optical system for optical pickup according to the present invention satisfies the following condition.

$$4.0 \times 10^{-5} < Mn/(tn-tc) \times f < 6.0 \times 10^{-4} \quad (1)$$

Here, tc is the thickness [μm] of a base plate at which a third-order spherical aberration which occurs when a parallel light beam is incident on the objective lens element is the minimum, f is the focal length [mm] of the objective lens element, and Mn is the imaging magnification of the objective lens element when a spot is formed through a base plate having a thickness tn [μm].

The condition (1) defines an optimum value of the imaging magnification of the objective lens element. The numerical range defined by the condition (1) is a range which is obtained by optimizing an entire third-order spherical aberration in view of two different occurrence factors for a third-order spherical aberration based on imaging magnification change in the case where a spot is formed at a position of a different base plate thickness and for a third-order spherical aberration based on base plate thickness change in this case. Thus, when the range of the condition (1) is exceeded, the entire third-order spherical aberration is too large on a base plate having a specific thickness, and the optical system cannot be put into practical use.

The optical system for optical pickup according to the present invention preferably satisfies the following condition.

$$1.0 \times 10^{-4} < [1-(NAn/NAc)]/(tn-tc) < 2.5 \times 10^{-4} \quad (2)$$

Here,

NAc is the numerical aperture of the objective lens element when a third-order spherical aberration which occurs when a parallel light beam is incident on the objective lens element is the minimum, and NAn is the numerical aperture of the objective lens element when a spot is formed through the base plate having the thickness tn [μm].

The condition (2) defines an optimum value of the numerical aperture of the objective lens element. The numerical range defined by the condition (2) is an allowable range of change of the numerical aperture which is caused by change of imaging magnification when a spot is formed at a position of a different base plate thickness. In other words, the numerical range defined by the condition (2) is an allowable range of imaging magnification change which directly influences numerical aperture change. Thus, when the range of the condition (2) is exceeded, change of the numerical aperture of the objective lens element is too great with respect to a base plate having a specific thickness, and the optical system cannot be put into practical use.

The optical system for optical pickup according to the present invention preferably satisfies the following conditions at the same time.

$$M0 > 0.005 \quad (3)$$

$$Mm < -0.005 \quad (4)$$

$$NA0/NAc < 0.997 \quad (5)$$

$$NAm/NAc > 1.003 \quad (6)$$

Here,

M0 is the imaging magnification of the objective lens element when a spot is formed through the base plate having the largest thickness, NA0 is the numerical aperture of the objective lens element when a spot is formed through the base plate having the largest thickness, Mm is the imaging magnification of the objective lens element when a spot is formed through the base plate having the smallest thickness, and NAm is the numerical aperture of the objective lens element when a spot is formed through the base plate having the smallest thickness.

The conditions (3) to (6) define a range of the imaging magnification of the objective lens element included in the optical system for optical pickup according to the present invention, and a range of the numerical aperture of the objective lens element included in the optical system for optical pickup. In the case of being out of any of the ranges of the conditions (3) to (6), optical performance mainly for a third-order spherical aberration generated by the objective lens element greatly deteriorates, and the optical system cannot be put into practical use.

The optical system for optical pickup according to the present invention preferably satisfies the following conditions at the same time.

$$|Mm|>|M0| \quad (7)$$

$$NAm-NAc>NAc-NA0 \quad (8)$$

Similarly to the aforementioned conditions (3) to (6), the conditions (7) and (8) define a range of the imaging magnification of the objective lens element included in the optical system for optical pickup according to the present invention, and a range of the numerical aperture of the objective lens element included in the optical system for optical pickup. In the case of being out of either one of the ranges of the conditions (7) and (8), optical performance mainly for a third-order spherical aberration generated by the objective lens element greatly deteriorates, and the optical system cannot be put into practical use.

The optical system for optical pickup according to the present invention preferably satisfies the following condition.

$$tc>(t0+tm)/2 \quad (9)$$

Here, t0 is the thickness [μm] of a base plate through which a spot corresponding to the recording surface is capable of being formed and which has the largest thickness, and tm is the thickness [μm] of the base plate having the smallest thickness.

The condition (9) defines a possible base plate thickness corresponding to the optical system for optical pickup. When the relationship of the condition (9) is not satisfied, a base plate thickness at which the third-order spherical aberration of the objective lens element is the smallest is either too thick or too thin. Thus, when the relationship of the condition (9) is not satisfied, a third-order spherical aberration difference is too great at a position of a base plate thickness greatly different from a base plate thickness tc at which a third-order spherical aberration is the minimum, and the optical system cannot be put into practical use.

The optical system for optical pickup according to the present invention preferably satisfies the following condition.

$$3CM(tc)<[3CM(t0)+3CM(tm)]/2 \quad (10)$$

Here,

3CM(tc) is an amount of third-order coma aberration which occurs when the objective lens is tilted at a unit angle relative to the optical axis and a spot is formed through a base material having the thickness tc, 3CM(t0) is an amount of third-order coma aberration which occurs when the objective lens is tilted at the unit angle relative to the optical axis and a spot is formed through a base material having the thickness t0, and 3CM(tm) is an amount of third-order coma aberration which occurs when the objective lens is tilted at the unit angle relative to the optical axis and a spot is formed through a base material having the thickness on.

The condition (10) is related to the coma aberration of the objective lens element and defines an optimum value of so-called off-axis performance. When the relationship of the condition (10) is not satisfied, a base plate thickness at which the third-order coma aberration of the objective lens element is the smallest is either too thick or too thin. Thus, when the relationship of the condition (10) is not satisfied, a third-order coma aberration difference is too great at a position of a base plate thickness greatly different from the base plate thickness tc at which a third-order coma aberration is the minimum, and the optical system cannot be put into practical use.

EXAMPLES

Hereinafter, Examples of the optical system for optical pickup according to the present invention will be specifically described with construction data, aberration diagrams, and the like. It should be noted that in each Numerical Example, a surface to which an aspheric coefficient is provided indicates a refractive optical surface having an aspherical shape, and the surface shape of an aspheric surface is defined by the following formula 1.

$$X = \frac{C_j h^2}{1+\sqrt{1-(1+k_j)C_j^2 h^2}} + \sum A_{j,n} h^n$$

Here,

X is the distance from an on-the-aspheric-surface point at a height h relative to the optical axis to a tangential plane at the top of the aspheric surface, h is the height relative to the optical axis, $C_j$ is the radius of curvature at the top of an aspheric surface of a lens jth surface ($C_j=1/R_j$), $k_j$ is the conic constant of the lens jth surface, and $A_{j,n}$ is the nth-order aspheric constant of the lens jth surface.

Numerical Example 1

Tables 1 to 4 show construction data of an objective lens element for BD according to Numerical Example 1.

TABLE 1

| Wavelength | 0.408 |
| Effective diameter | φ2.38 |
| NA | 0.85 |
| Working distance (WD) | 0.25 |
| Disc thickness (DT) | 0.07 |
| Focal length | 1.40 |

TABLE 2

| Surface No. | Radius of curvature at the top of lens surface | Thickness | Material | Remarks |
| --- | --- | --- | --- | --- |
| 0 | ∞ | | | |
| 1 | 0.9970145 | 2.241405 | | Aspherical surface |
| 2 | −0.6669094 | WD | n1 | Aspherical surface |
| 3 | ∞ | DT | Disc | Planar |
| 4 | ∞ | | | Planar |

TABLE 3

| Wavelength | 0.406 |
| n1 | 1.54231 |
| Disc | 1.61642 |

TABLE 4

| First surface | Aspherical constants Aspherical surface |
|---|---|
| RD | 0.99701450 |
| CC | -0.60588070 |
| A2 | 0.00000000 |
| A4 | 0.01839012 |
| A6 | -0.00170066 |
| A8 | 0.01607098 |
| A10 | -0.01783399 |
| A12 | -0.00199235 |
| A14 | 0.01590186 |
| A16 | -0.00856066 |

| Second surface | Aspherical constants |
|---|---|
| RD | -0.66690940 |
| CC | -21.22059000 |
| A2 | 0.00000000 |
| A4 | 0.29414112 |
| A6 | -0.96505986 |
| A8 | -0.54577907 |
| A10 | 4.80515730 |
| A12 | 3.92797130 |
| A14 | -33.58834300 |
| A16 | 34.51382800 |

The objective lens element according to Numerical Example 1 is designed such that recording or reproducing can be performed on the multilayer disc having the layer configuration shown in FIG. 2. The multilayer disc shown in FIG. 2 has four information recording surfaces L0, L1, L2, and L3 in order from the deep side of a light incident side surface. The distances from the multilayer disc front surface to the layers of L0, L1, L2, and L3 are 100 μm, 83 μm, 62 μm, and 35 μm, respectively. In addition, in the objective lens element according to Numerical Example 1, the focal length is 1.4 mm, the NA is 0.85, the working distance is 0.25 mm, and the effective diameter is φ2.38 mm. The designed central base material thickness is 70 μm. The designed central base material thickness refers to a disc base material thickness at which a third-order spherical aberration which occurs when parallel light is incident on the objective lens element is the smallest.

Table 5 shows optical system imaging magnification and image-side NA when light is converged on each of the information recording surfaces L0 to L3.

TABLE 5

| Thickness of light-transmitting layer tn | Thickness of designed central base material tc | Focal length f | Designed central imaging magnification NAc | Imaging magnification Mn | Image-side NA NAn |
|---|---|---|---|---|---|
| 35 μm | 70 μm | 1.4 mm | 0.85 | -0.0136 | 0.856 |
| 62 μm | 70 μm | 1.4 mm | 0.85 | -0.0029 | 0.851 |
| 83 μm | 70 μm | 1.4 mm | 0.85 | 0.0046 | 0.848 |
| 100 μm | 70 μm | 1.4 mm | 0.85 | 0.0103 | 0.846 |

Table 6 shows a third-order coma aberration when the objective lens element according to Numerical Example 1 is tilted by 1 degree. In Table 6, tc is the thickness of a base material at which a third-order spherical aberration which occurs when a parallel light beam is incident on the objective lens element is the minimum, t0 is the thickness of the largest base material, and to is the thickness of the smallest base material. 3CM(tc), 3CM(t0), and 3CM(tm) represent amounts of third-order coma aberration which occurs when spots are formed through base materials having thicknesses tc, t0, and tm, respectively, in the case where the objective lens element is tilted by 1 degree.

TABLE 6

| | Lens tilt of 1 deg | Thickness of base material |
|---|---|---|
| 3CM(tc) | 37.6 mλ | 70 μm |
| 3CM(t0) | 23.4 mλ | 100 μm |
| 3CM(tn) | 56.2 mλ | 35 μm |

Figure 14:
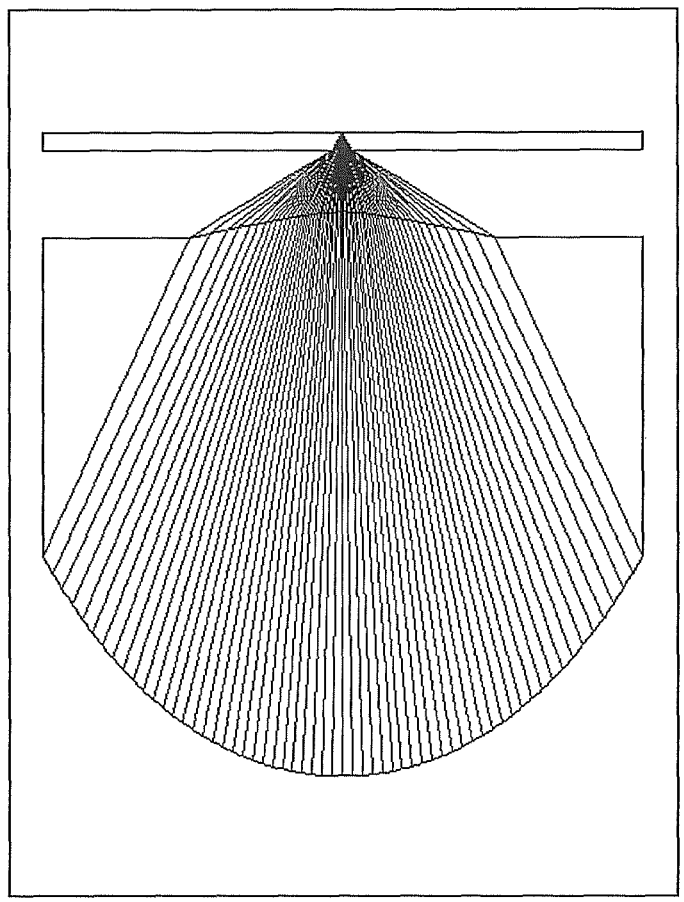
FIG. 14 is an optical path diagram of an objective lens element according to Numerical Example 1.
Figure 15:
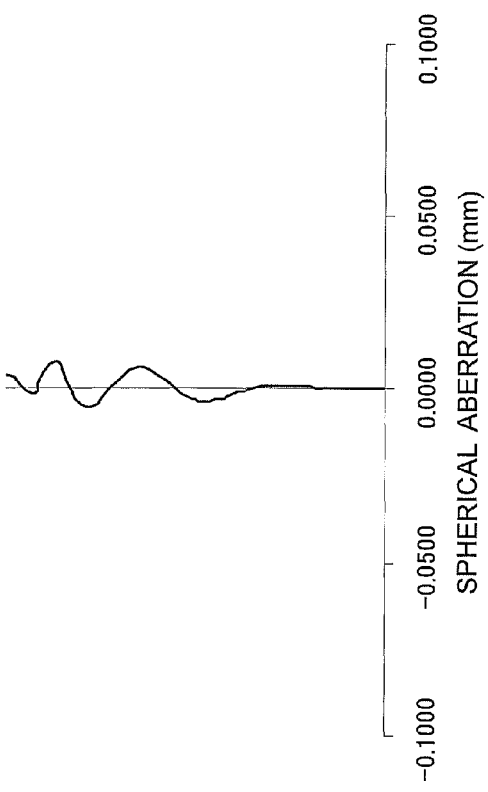
FIG. 15 is a graph showing a spherical aberration when parallel light is incident on the objective lens element according to Numerical Example 1 and a spot is formed through a base material having a thickness of 70 µm.
Figure 16:
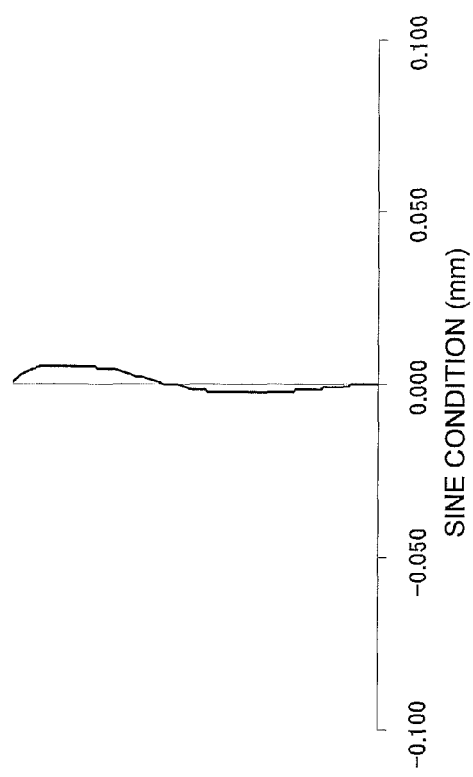
FIG. 16 is a graph showing a sine condition when parallel light is incident on the objective lens element according to Numerical Example 1 and a spot is formed through the base material having a thickness of 70 µm.

FIG. 14 is an optical path diagram of the objective lens element according to Numerical Example 1. FIG. 15 is a graph showing a spherical aberration when parallel light is incident on the objective lens element according to Numerical Example 1 and a spot is formed through a base material having a thickness of 70 μm. FIG. 16 is a graph showing a sine condition when parallel light is incident on the objective lens element according to Numerical Example 1 and a spot is formed through the base material having a thickness of 70 μm.

Numerical Example 2

Tables 7 to 10 show construction data of an objective, lens element according to Numerical Example 2.

TABLE 7

| Wavelength | 0.408 |
|---|---|
| Effective diameter | φ2.04 |
| NA | 0.85 |
| Working distance (WD) | 0.27 |
| Disc thickness (DT) | 0.075 |
| Focal length | 1.20 |

TABLE 8

| Surface No. | Radius of curvature at the top of lens surface | Thickness | Material | Remarks |
|---|---|---|---|---|
| 0 | ∞ | | | |
| 1 | 0.8689901 | 1.662436 | | Aspherical surface |
| 2 | -1.456676 | WD | n1 | Aspherical surface |
| 3 | ∞ | DT | Disc | Planar |
| 4 | ∞ | | | Planar |

TABLE 9

| Wavelength | 0.408 |
|---|---|
| n1 | 1.62574 |
| Disc | 1.61642 |

TABLE 10

| First surface | Aspherical constants Aspherical surface |
|---|---|
| RD | 0.8689901 |
| CC | -0.6008686 |
| A2 | 0.00000000 |
| A4 | 0.034049677 |
| A6 | 0.010734941 |
| A8 | 0.023414398 |
| A10 | -0.022027379 |
| A12 | 0.009308673 |
| A14 | 0.034248846 |
| A16 | -0.03104054 |

| Second surface | Aspherical constants |
|---|---|
| RD | -1.456676 |
| CC | -81.65864 |
| A2 | 0.00000000 |

TABLE 10-continued

| | |
|---|---|
| A4 | 0.66721948 |
| A6 | −1.9837948 |
| A8 | −1.2595444 |
| A10 | 14.679123 |
| A12 | −4.4083262 |
| A14 | −68.890593 |
| A16 | 86.190108 |

The objective lens element according to Numerical Example 2 is designed such that recording or reproducing can be performed on the multilayer disc having the information recording surfaces L0, L1, L2, and L3 of four layers. The distances from the multilayer disc front surface to the layers or L0, L1, L2, and L3 are 100 μm, 85 μm, 65 μm, and 45 μm, respectively. In addition, in the objective lens element according to Numerical Example 2, the focal length is 1.2 mm, the NA is 0.85, the working distance is 0.27 min, and the effective diameter is φ2.04 mm. The designed central base material thickness is 75 μm. Here, the designed central base material thickness refers to a disc base material thickness at which a third-order spherical aberration which occurs when parallel light is incident on the objective lens element is the smallest.

Figure 17:
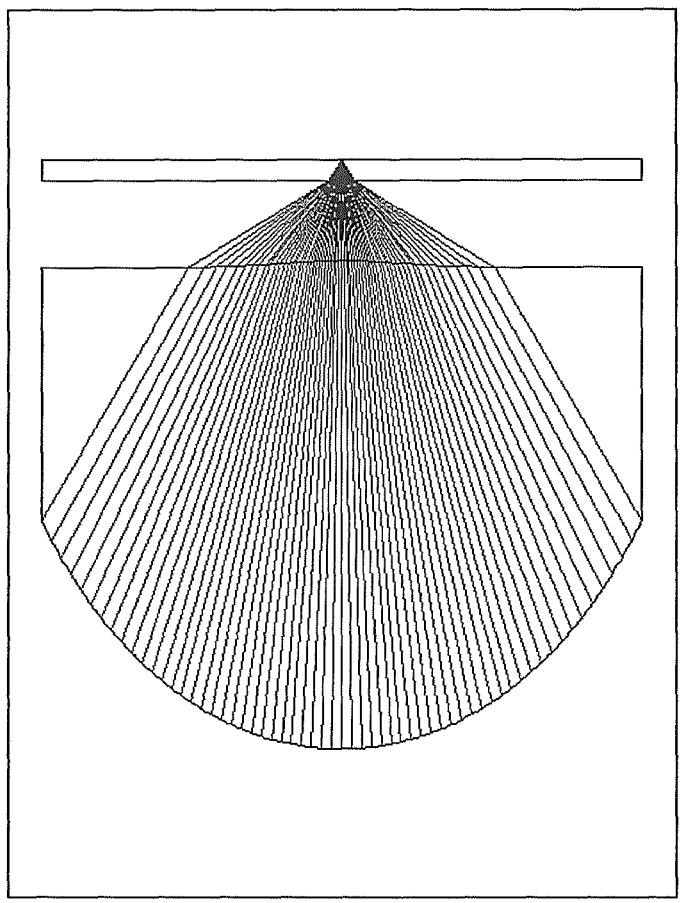
FIG. 17 is an optical path diagram of an objective lens element according to Numerical Example 2.
Figure 18:
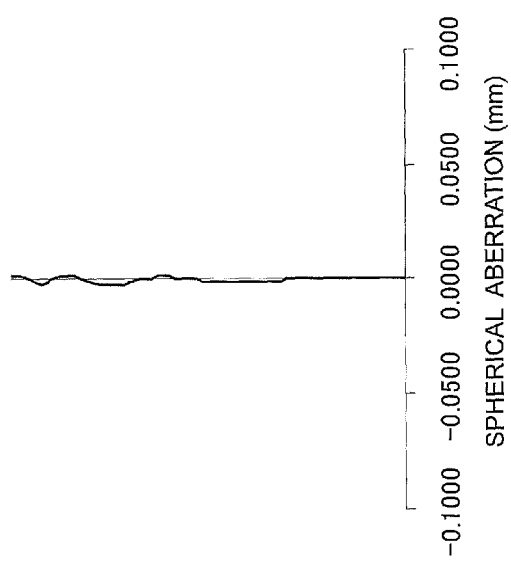
FIG. 18 is a graph showing a spherical aberration when parallel light is incident on the objective lens element according to Numerical Example 2 and a spot is formed through a base material having a thickness of 70 µm.
Figure 19:
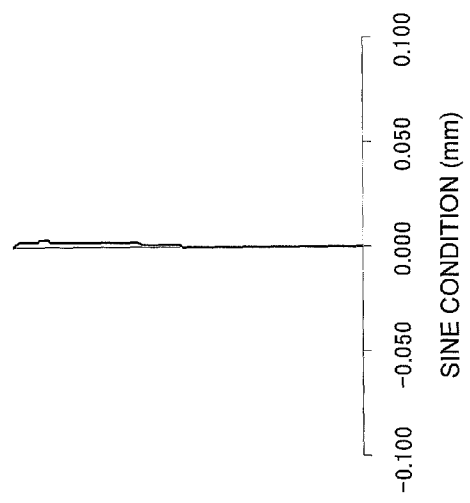
FIG. 19 is a graph showing a sine condition when parallel light is incident on the objective lens element according to Numerical Example 2 and a spot is formed through the base material having a thickness of 70 µm.
Figure 20:
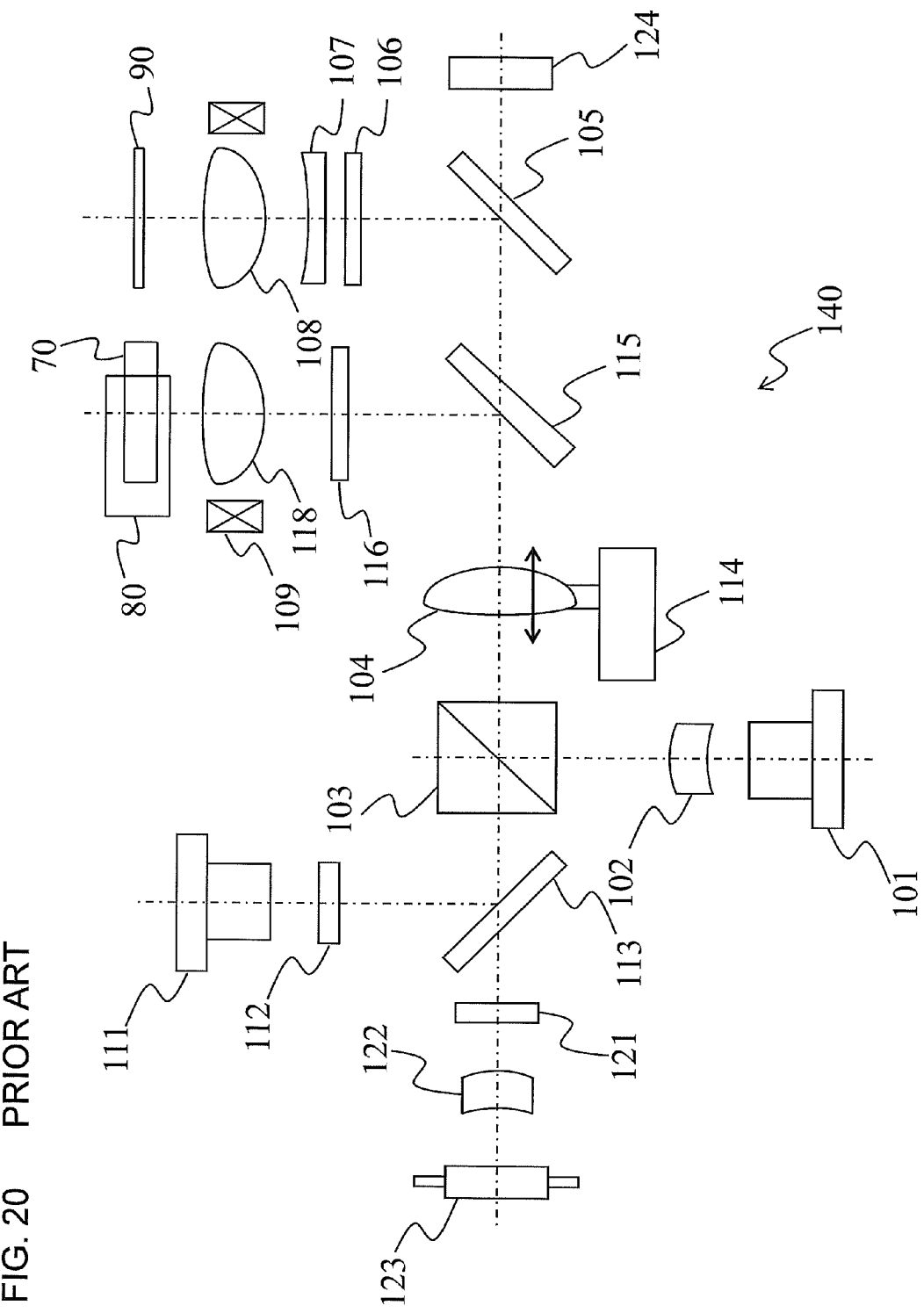
FIG. 20 is a diagram showing an example of an optical pickup device configured with two objective lenses.
Figure 21:
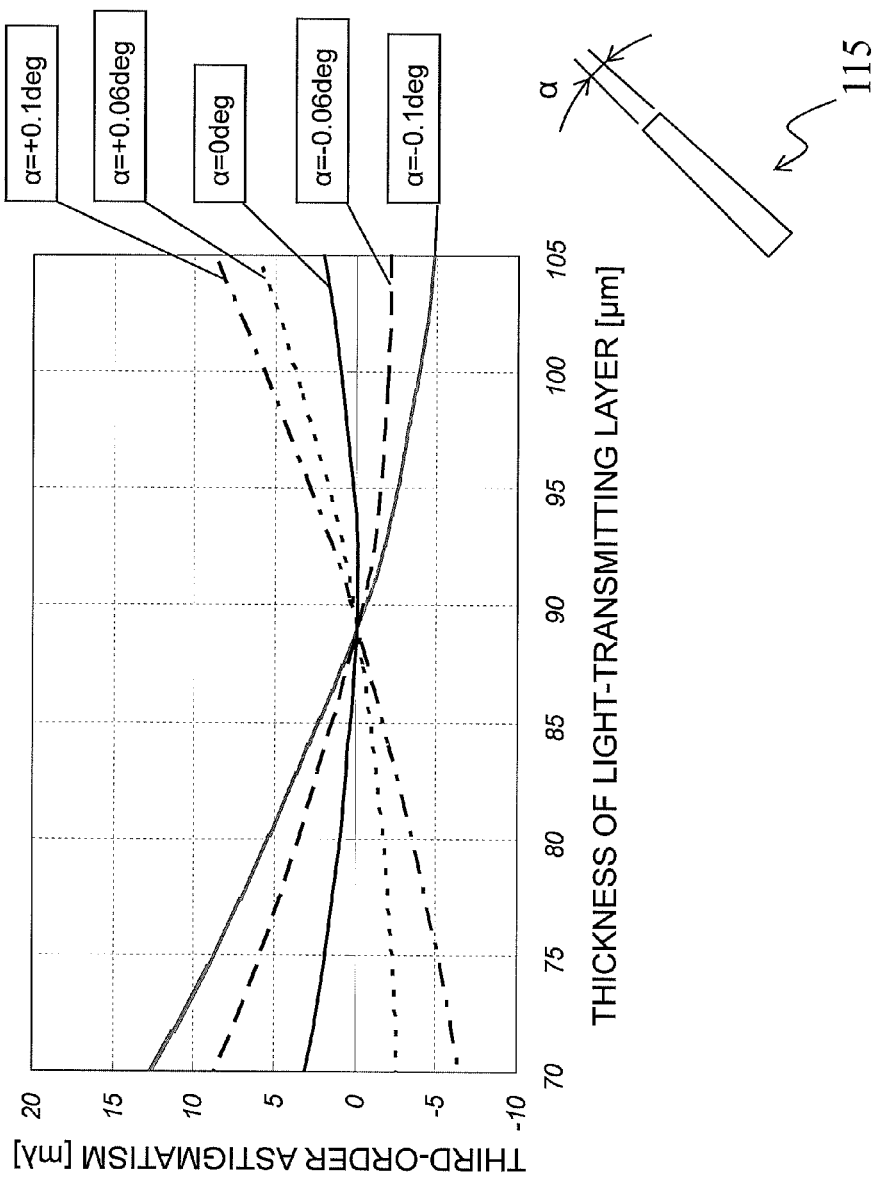
FIG. 21 is a graph showing a result obtained by calculating, for each vertex angle of a wedge-shaped mirror, how a third-order astigmatism changes when a collimating lens is moved in accordance with the thickness of a light-transmitting layer.

FIG. 17 is an optical path diagram of the objective lens element according to Numerical Example 2. FIG. 18 is a graph showing a spherical aberration when parallel light is incident on the objective lens element according to Numerical Example 2 and a spot is formed through a base material having a thickness of 70 μm. FIG. 19 is a graph showing a sine condition when parallel light is incident on the objective lens element according to Numerical Example 2 and a spot is formed through the base material having a thickness of 70 μm.

Table 11 shows optical system imaging magnification and image-side NA when light is converged on each of the information recording surfaces L0 to L3.

TABLE 11

| Thickness of light-transmitting layer tn | Thickness of designed central base material tc | Focal length f | Designed central imaging magnification NAc | Imaging magnification Mn | Image-side NA NAn |
|---|---|---|---|---|---|
| 45 μm | 75 μm | 1.2 mm | 0.85 | −0.0134 | 0.855 |
| 65 μm | 75 μm | 1.2 mm | 0.85 | −0.0042 | 0.852 |
| 85 μm | 75 μm | 1.2 mm | 0.85 | 0.0041 | 0.848 |
| 100 μm | 75 μm | 1.2 mm | 0.85 | 0.0098 | 0.846 |

Table 12 shows a third-order coma aberration when the objective lens element according to Numerical Example 2 is tilted by 1 degree. In Table 12, tc is the thickness of a base material at which a third-order spherical aberration which occurs when a parallel light beam is incident on the objective lens element is the minimum, t0 is the thickness of the largest base material, and to is the thickness of the smallest base material. 3CM(tc), 3CM(t0), and 3CM(tm) represent amounts of third-order coma aberration which occurs when spots are formed through base materials having thicknesses tc, t0, and tm, respectively, in the case where the objective lens element is tilted by 1 degree.

TABLE 12

| | Lens tilt of 1 deg | Thickness of base material |
|---|---|---|
| 3CM(tc) | 69.4 | 75 μm |
| 3CM(t0) | 34.1 | 100 μm |
| 3CM(tn) | 119.1 | 45 μm |

Table 13 shows values corresponding to the individual conditions in the objective lens element according to each Numerical Example.

TABLE 13

| | | Numerical examples | |
|---|---|---|---|
| | Formulas | 1 | 2 |
| (1) | $M_n/(t_n − t_c) \times f$ | $5.43 \times 10^{-4}$ ($t_n = 35$ μm) | $5.38 \times 10^{-4}$ ($t_n = 45$ μm) |
| | | $5.12 \times 10^{-4}$ ($t_n = 62$ μm) | $5.10 \times 10^{-4}$ ($t_n = 65$ μm) |
| | | $4.97 \times 10^{-4}$ ($t_n = 83$ μm) | $4.86 \times 10^{-4}$ ($t_n = 85$ μm) |
| | | $4.82 \times 10^{-4}$ ($t_n = 100$ μm) | $4.71 \times 10^{-4}$ ($t_n = 100$ μm) |
| (2) | $[1 − (NA_n/NA_c)]/(t_n − t_c)$ | $1.88 \times 10^{-4}$ ($t_n = 35$ μm) | $2.05 \times 10^{-4}$ ($t_n = 45$ μm) |
| | | $1.67 \times 10^{-4}$ ($t_n = 62$ μm) | $1.90 \times 10^{-4}$ ($t_n = 65$ μm) |
| | | $1.81 \times 10^{-4}$ ($t_n = 83$ μm) | $1.82 \times 10^{-4}$ ($t_n = 85$ μm) |
| | | $1.73 \times 10^{-4}$ ($t_n = 100$ μm) | $1.74 \times 10^{-4}$ ($t_n = 100$ μm) |
| (3) | M0 | 0.0103 | 0.0098 |
| (4) | Mm | −0.0136 | −0.0134 |
| (5) | NA0/NAc | 0.992 | 0.995 |
| (6) | NAm/NAc | 1.007 | 1.006 |
| (7) | |Mm| | 0.0136 | 0.0134 |
| | |M0| | 0.0103 | 0.0098 |
| (8) | NAm − NAc | 0.006 | 0.005 |
| | NAc − NA0 | 0.004 | 0.004 |
| (9) | tc | 70 | 75 |
| | (t0 + tm)/2 | 67.5 | 72.5 |
| (10) | 3CM(tc) | 37.6 | 69.4 |
| | [3CM(t0) + 3CM(tm)]/2 | 39.8 | 76.6 |

The optical system according to the present invention is configured at low cost and is capable of favorably performing recording or reproducing, in particular, on a multilayer optical disc having information recording surfaces of three layers or more.

While the invention has been described in detail, the foregoing description is in all aspects illustrative and not restrictive. It will be understood that numerous other modifications and variations can be devised without departing from the scope of the invention.

What is claimed is:

1. An optical system for an optical pickup that converges an incident light beam onto an optical recording medium, the optical recording medium having at least three recording surfaces located parallel to each other, the optical system converging the incident light beam through an incident surface of a base material of the optical recording medium onto any of the at least three recording surfaces to form spots corresponding to the recording surfaces, the optical system comprising:

a magnification conversion optical element moving along an optical axis direction in accordance with each recording surface; and an objective lens element converging a light beam incident through the magnification conversion optical element, to form a spot on a corresponding recording surface among the recording surfaces, wherein the optical system satisfies the following formula, $$4.0 \times 10^{-4} < M_n/(t_n − t_c) \times f < 6.0 \times 10^{-4} \quad (1),$$

where tc is a thickness [μm] through the recording-medium base material at which, with the objective lens element forming a parallel light beam incident thereon into a spot, third-order spherical aberration is minimum, tc therein being a thickness from the base-material incident surface to a plane different from any of the at least three recording surfaces, f is the focal length [mm] of the objective lens element, and Mn is the imaging magnification of the objective lens element when a spot is formed through a thickness tn [μm] of the recording-medium base material, tn therein being, distinct from the thickness tc, a thickness of the base material to any of the at least three recording surfaces.

2. The optical system according to claim 1, wherein the optical system satisfies the following formula, $$1.0 \times 10^{-4} < [1-(NAn/NAc)]/(tn-tc) < 2.5 \times 10^{-4} \quad (2),$$

where

NAc is the numerical aperture of the objective lens element when a third-order spherical aberration which occurs when a parallel light beam is incident on the objective lens element is the minimum, and NAn is the numerical aperture of the objective lens element when a spot is formed through the thickness tn [μm] of the base material.

3. The optical system according to claim 2, wherein the optical system satisfies the following formulas, $$M0 > 0.005 \quad (3),$$

$$Mm < -0.005 \quad (4),$$

$$NA0/NAc < 0.997 \quad (5),$$

and $$NAm/NAc > 1.003 \quad (6),$$

where

M0 and NA0 are the imaging magnification and the numerical aperture, respectively, of the objective lens element when a spot is formed through the largest thickness of the base material from the incident surface thereof to a recording surface, and Mm and NAm are the imaging magnification and the numerical aperture, respectively, of the objective lens element when a spot is formed through the smallest thickness of the base material from the incident surface thereof to a recording surface.

4. The optical system according to claim 3, wherein the optical system satisfies the following formulas, $$|Mm| > |M0| \quad (7),$$

and $$NAm-NAc > NAc-NA0 \quad (8).$$

5. The optical system according to claim 1, wherein the optical system satisfies the following formula, $$tc > (t0+tm)/2 \quad (9),$$

where t0 is the largest thickness [μm] of the base material through which a spot corresponding to a recording surface is capable of being formed, and tm is the smallest thickness [μm] of the base material from the incident surface thereof to a recording surface.

6. The optical system according to claim 1, wherein the optical system satisfies the following formula, $$3CM(tc) < [3CM(t0)+3CM(tm)]/2 \quad (10),$$

where

3CM(tc) is an amount of third-order coma aberration which occurs when the objective lens is tilted at a unit angle relative to the optical axis and a spot is formed through the thickness tc of the base material, 3CM(t0) is an amount of third-order coma aberration which occurs when the objective lens is tilted at the unit angle relative to the optical axis and a spot is formed through a thickness t0 of the base material, 3CM(tm) is an amount of third-order coma aberration which occurs when the objective lens is tilted at the unit angle relative to the optical axis and a spot is formed through a thickness tm of the base material, t0 is the largest thickness [μm] of a base material through which a spot corresponding to a recording surface is capable of being formed, and tm is the smallest thickness [μm] of the base material from the incident surface thereof to a recording surface.

* * * * *